US010289238B2

(12) United States Patent
Lee et al.

(10) Patent No.: US 10,289,238 B2
(45) Date of Patent: May 14, 2019

(54) ELECTRONIC DEVICE HAVING MULTI-FUNCTIONAL HUMAN INTERFACE

(71) Applicant: INNOPRESSO, Inc., Daejeon (KR)

(72) Inventors: Jeonghwan Lee, Yongin-si (KR); Eunhyung Cho, Yongin-si (KR)

(73) Assignee: INNOPRESSO, Inc., Daejeon (KR)

( * ) Notice: Subject to any disclaimer, the term of this patent is extended or adjusted under 35 U.S.C. 154(b) by 365 days.

(21) Appl. No.: 15/364,252

(22) Filed: Nov. 29, 2016

(65) Prior Publication Data
US 2017/0322663 A1 Nov. 9, 2017

(30) Foreign Application Priority Data

May 3, 2016 (KR) .................. 10-2016-0054372
Jun. 23, 2016 (KR) .................. 10-2016-0078314
Oct. 25, 2016 (KR) .................. 10-2016-0139196

(51) Int. Cl.
*G06F 3/041* (2006.01)
*G06F 3/0488* (2013.01)
*G06F 3/02* (2006.01)
*G06F 3/042* (2006.01)
*G06F 3/044* (2006.01)

(52) U.S. Cl.
CPC .......... *G06F 3/0416* (2013.01); *G06F 3/0213* (2013.01); *G06F 3/04883* (2013.01); *G06F 3/04886* (2013.01); *G06F 3/042* (2013.01); *G06F 3/044* (2013.01); *G06F 2203/04105* (2013.01)

(58) Field of Classification Search
CPC .. G06F 3/0416; G06F 3/0213; G06F 3/04883; G06F 3/04886; G06F 3/042; G06F 3/044; G06F 2203/04105
See application file for complete search history.

(56) References Cited

U.S. PATENT DOCUMENTS

| | | | | | |
|---|---|---|---|---|---|
| 2010/0231553 | A1* | 9/2010 | Yabuuchi | .............. | G06F 3/0416 345/174 |
| 2010/0265173 | A1* | 10/2010 | Matsunaga | ........... | G06F 3/0334 345/157 |
| 2013/0147795 | A1* | 6/2013 | Kim | ........................ | G06F 21/36 345/419 |

* cited by examiner

*Primary Examiner* — Sejoon Ahn
(74) *Attorney, Agent, or Firm* — Park, Kim & Suh, LLC

(57) ABSTRACT

According to an aspect of present invention provides electronic device having a multi-functional human interface, device comprising, first to fifth multi-functional input buttons, wherein each of multi-functional input buttons includes an electrode unit including a transmitter unit and a receiver unit, transmitter unit has first and second transmitters having driver signal periods different from each other, and receiver unit has first to fourth receivers having at least two scan signal periods different from each other, first receiver of fourth multi-functional input button has a scan signal period same as a scan signal period of fourth receiver of second multi-functional input button, second receiver of fourth multi-functional input button has a scan signal period same as a scan signal period of first receiver of first multi-functional input button, third receiver of fourth multi-functional input button has a scan signal period same as a scan signal period of second receiver of first multi-functional input button, and fourth receiver of fourth multi-functional input button has a scan signal period same as scan signal periods of third receiver of first multi-functional input button and first receiver of fifth multi-functional input button.

13 Claims, 22 Drawing Sheets

ELECTRONIC DEVICE HAVING MULTI-FUNCTIONAL HUMAN INTERFACE

CROSS-REFERENCE TO RELATED APPLICATION

This application claims priority from Korean Patent Application No. 10-2016-0054372 filed on May 3, 2016, Korean Patent Application No. 10-2016-0078314 filed on Jun. 23, 2016, and Korean Patent Application No. 10-2016-0139196 filed on Oct. 25, 2016 in the Korean Intellectual Property Office, the disclosure of which is incorporated herein by reference in its entirety.

BACKGROUND

Technical Field

The present inventive concept relates to a human interface: for receiving, from a user, an input of text information or pointing location information at a digital device capable of receiving the text information or pointing location information, such as a computer, a notebook, a tablet PC, and a portable phone; and transmitting the received information to the digital device.

Description of the Related Art

Text input devices such as a keyboard have been proposed for inputting text to a personal computer or a portable digital device. Furthermore, pointing devices such a mouse have been proposed for controlling a pointing location of a pointer and for performing a function for controlling the digital device.

Conventional text input devices and pointing devices may be provided separately, or pointing input regions of the pointing devices may be provided in a location separated from text input regions of the text input devices. This may cause users hand to move too frequently under the working environment in which a text input operation, a pointing location input operation, and a pointer execution instruction input operation are frequently switched, thereby degrading work efficiency.

SUMMARY

An embodiment of the present inventive concept provides a human interface in which a pointing location information input region of a pointing device is provided on a text input region of a text input device, and a switching unit for switching between a text input mode and a pointing location information input mode is provided, thus enabling a pointing input operation to be performed with minimized movement of users hand through simple switching of an input mode during a text input operation, thereby improving work efficiency.

The text input device and the pointing device, which are provided separately, are integrated in one human interface device so as to reduce unit price and size of a product and eliminate unnecessary user operation, thereby improving work efficiency.

DETAILED DESCRIPTION OF THE EMBODIMENTS

Figure 1:
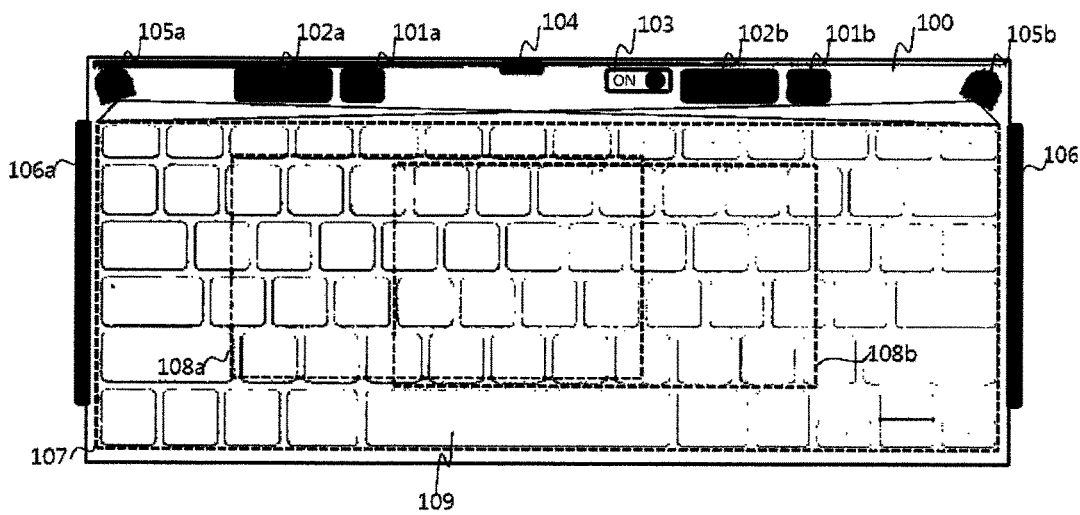
FIG. 1 illustrates an exemplary embodiment of a text input device integrated with a pointing device.

The present inventive concept relates to a human interface: for receiving, from a user, an input of text information or pointing location information at a digital device capable of receiving the text information or pointing location information, such as a computer, a notebook, a tablet PC, and a portable phone; and transmitting the received information to the digital device.

A keyboard formed of a plurality of buttons connected to an elastic body and a switch has widely been used as an existing text information input device.

Furthermore, a digital device having a touch interface employs a method in which a virtual keyboard is displayed on a display, and when a part of user body touches the virtual keyboard displayed on the display, a user's gesture or an electrical signal is sensed, and then the text on the virtual keyboard displayed on the part touched by the user may be input.

The touch interface may recognize the user touch by recognizing movement of the part of user body, by recognizing contact with a specific contact surface, by sensing a flow of current through the user body, or by sensing light, sound waves or the like from being blocks or interfered with the part of user body.

Examples of the touch interface include a pressure sensing touch screen, a capacitive touch screen, an optical touch screen, and an ultrasonic touch screen.

A resistive touch screen or the pressure sensing touch screen operates by recognizing pressure.

The resistive touch screen is known to have advantages in terms of low cost, a stylus pen for writing, and greater precision for writing letters in a small space, but also known to have disadvantages in that, since the resistive touch screen uses pressure, heavy pressing may not be recognized, and the feeling of touch may be slightly dull as compared with the capacitive touch screen.

The resistive touch screen may be formed of multiple layers.

Among the multiple layers, a conductive layer is formed of two layers facing each other with an air layer therebetween.

When an outer screen is pressed, the two layers of the conductive layer contact each other, which causes change in resistance and current and thus enables a touch to be recognized.

A capacitive sensing or capacitive touch method senses an operation by using capacitive coupling effects.

Unlike the pressure sensing touch screen using pressure, the capacitive touch screen is made of indium tin oxide, which is glass having high conductivity.

The glass has sensors attached to four edges thereof, causing current to flow along the surface of the glass.

The capacitive touch method recognizes changes in the current through the sensors attached to fore edges.

Upon touching the screen with a finger of the user, electrons flowing along the glass flow into the body of the user through finger, and the sensors sense the location where changes occur so as to operate the capacitive touch screen.

The capacitive touch screen is known to allow smoother feeling of manipulation and scroll as compared with the pressure sensing touch screen since the capacitive touch screen does not require heavy pressing on the screen but recognizes even just a slight touch on the screen.

Furthermore, the capacitive touch method allows multitouch capable of touching multiple points.

Since the capacitive touch screen operates using an amount of change in current, the capacitive touch screen may not be operated with fingers wearing leather gloves which do not conduct current, fingernails, or stylus pens.

However, users may operate the capacitive touch screen by using a separate dedicated stylus pen.

The sensors may be sensitive and thus can be influenced by peripheral devices.

The optical touch screen includes an infrared camera and infrared lighting mounted on the vertex thereof so as to measure coordinates by the shadow of an object to touch the screen.

The ultrasonic touch screen emits ultrasonic waves thereon so as to sense interference effects caused by a user touch and measures coordinates for operation.

The present inventive concept may employ other various touch input techniques which can be used in sensing contact or motion of a user so as to recognize location information of a part of user body and control location information of a pointer.

FIG. 1 illustrates an exemplary embodiment of a text input device integrated with a pointing device.

The text input device integrated with a pointing device may include a housing 100 for supporting the text input device and a pointer location information input region.

The housing may have strength sufficient for enduring pressure of user input, and include a control unit, a memory unit, a battery unit, an encoding unit, a transmitting unit, and the like so as to receive text input information and pointer location information input information and transmit corresponding information to a digital device connected to the text input device integrated with a pointing device in a wired or wireless manner.

The text input device integrated with a pointing device may include a plurality of buttons 109 for receiving text input information from a user.

The plurality of buttons 109 may be formed of physical buttons or virtual buttons.

Since the physical buttons may be formed of buttons connected to an elastic body, or may be elastic per se, the physical buttons may move when an input is received from the user and return to the original location when pressure applied from the user is removed.

Since the physical buttons may be connected to an electrical switch, the physical buttons may move when the pressure is applied from the user and a phase of the electrical switch changes to generate a text input value of the buttons.

The physical buttons may be elastic but may not be connected to an electrical switch, and may move when the pressure is applied from the user and return to the original location when the pressure applied from the user is removed. The text input information of the user may be generated by the touch input device on the basis of the location information in which the pressure or gesture of the user is recognized.

The virtual buttons may be text input buttons displayed on a display device.

The virtual buttons may be certain buttons displayed by projecting light to a transparent or semi-transparent object.

The virtual buttons may not be recognized by user's eye, and may have unique location information for each text and generate relevant text input information on the basis of user's pressure or gesture information.

The text input device integrated with a pointing device may have a text input region 107 and pointing location information input regions 108a and 108b having at least a part thereof shared with the text input region 107.

The pointing location information input regions 108a and 108b may be located at a surface, a top, or a bottom of the button for inputting text, and as shown in FIG. 1, the pointing location information input regions 108a and 108b may have at least a part thereof shared with the text input region 107.

The pointing location information input regions 108a and 108b may include the text input region 107, or the text input region 107 may include the pointing location information input regions 108a and 108b.

The pointing location information input regions 108a and 108b and the text input region 107 may have at least a part thereof shared therebetween, and the at least a part thereof may be used as the pointing location information input regions 108a and 108b but not as the text input region 107, and the at least a part thereof may be used as the text input region 107 but not as the pointing location information input regions 108a and 108b.

The text input device integrated with a pointing device may include a pointer location information input device 105 for forming a virtual text input region or a virtual pointing location information input region for inputting text, pointing location information, or both the text and pointing location information, the pointer location information input device 105 being disposed on or outside the text input device integrated with a pointing device.

The pointer location information input device 105 such as an infrared ray generator and an infrared ray receiver, an RGB camera, an ultrasonic generator and an ultrasonic receiver, or an infrared ray generator and an infrared camera may sense a part of user body on a surface of or above the housing 100 so as to receive location information and gesture information.

The pointer location information input device 105 may be formed into a plurality of devices so as to extend the pointer location information input region or improve accuracy and sensitivity of the pointer location information input region.

For example, a pointer location information input device 105b may be provided to allow text input by a right hand or for the pointing location information input region 108b for the right hand.

Furthermore, a pointer location information input device 105a may be provided to allow text input by a left hand or for the pointing location information input region 108a for the left hand.

The text input region for the right hand or the pointing location information input region 108b for the right hand may include a region of letter J button on a standard English keyboard.

The text input region for the left hand or the pointing location information input region 108a for the left hand may include a region of letter F button on a standard English keyboard.

The pointer location information input device 105 may include both the region of letter J button and the region of letter F button on a standard English keyboard.

When the text input device integrated with a pointing device is connected to a plurality of digital devices having display units, the pointing location information input regions 108a and 108b may allow a pointer to be movable on the plurality of display units.

For example, the pointing location information input region may be divided so as to be matched with respective display units, or a separate button indicating the display units may operate so as to transmit pointer location information from a relevant display unit, or the plurality of display units may be recognized as a virtual single display unit and the pointer location information may be transmitted such that a pointer can move on the virtual single display unit.

The text input device integrated with a pointing device may include a pointing location information input device having a pointing input region and receiving pointer location information from a user; and pointer execution instruction units 101 and 102 for executing at least one function on a button, image, space, icon, or a text input window on which the pointer moved by the pointing location information input device is located.

The pointer execution instruction units 101 and 102 may be formed of one or two buttons, perform respectively first and second functions, and located at a left side, a right side, or a center of the housing.

The first function may be, for example, a left click function of a computer mouse, and the second function may be, for example, aright click function of a computer mouse.

The pointer execution instruction units formed of one or two buttons may be located at both the left and right sides of the housing, providing use convenience to both left-handed and right-handed persons.

The pointer execution instruction units 101 and 102 may operate by a touch of a part of user body, light blocking, interference of ultrasonic waves, or recognition of a shadow of a part of user body through the use of the touch techniques described above.

The pointer execution instruction units 101 and 102 may be formed of elastic physical buttons.

The pointer execution instruction units 101 and 102 may operate by using at least one of text buttons disposed in a text input region outside a pointing location information input region.

The pointer execution instruction units 101 and 102 may operate by selecting a physical or virtual text button on the pointing location information input region.

For example, when a virtual input device is used as a pointing location information input device and a physical button is used as a text input device, pointer location information may be input on a virtual pointing location information input region and the physical text button located at the corresponding location may be pressed so as to generate a pointer execution instruction in a pointing location information input mode.

The pointer execution instruction units 101 and 102 may receive pointer location information by a first user gesture in the pointing location information input region, and generate a pointer execution instruction by a second user gesture at the same location.

The pointer execution instruction units 101 and 102 may enable a first function to be performed by a first gesture of a user body, a first voice, a first eye blinking, a first mouth shape, or the like.

The pointer execution instruction units 101 and 102 may enable a second function to be performed by a second gesture of a user body, a second voice, a second eye blinking, a second mouth shape, or the like.

The text input device integrated with a pointing device may operate in a text input mode for receiving text information through the text input device, and a pointing location information input mode for receiving pointing location information through the pointing location information input device.

Both the text input mode and the pointing location information input mode may be switched by a mode switching unit 103.

The mode switching unit 103 may be formed of a switch located separately on the housing.

The mode switching unit 103 may perform mode switching by sensing an input received through at least one text input button of the text input device, or simultaneous receptions of a plurality of text inputs.

The mode switching unit 103 may switch modes by receiving control information from the digital device connected to the text input device integrated with a pointing device in a wired or wireless manner.

The mode switching unit 103 may be formed integrally with the pointer execution instruction unit 102.

For example, a first touch or first pressure by a first gesture such as a contact of a part of user body on the pointer execution instruction unit 102 which shows a primary reaction to the first touch or first pressure and a secondary reaction to a second touch or second pressure may be sensed so as to switch modes, and a reaction to the second touch or second pressure by a second gesture such as a button pressing gesture may generate a pointer execution instruction.

The mode switching unit 103 may include a temporary switching mode and a permanent switching mode.

For example, the temporary switching mode may be set in which a text input mode is switched to a pointing location information input mode in reaction to the first touch or first pressure, and the pointing location information input mode is switched again to the text input mode when the first touch or first pressure is removed.

Alternatively, the temporary switching mode may be set in which a pointing location information input mode is switched to a text input mode in reaction to the first touch or first pressure, and the text input mode is switched again to the pointing location information input mode when the first touch or first pressure is removed.

The permanent switching mode may be set in which a text input mode is switched to a pointing location information input mode in reaction to the second touch or second pressure, and the pointing location information input mode is maintained when the second touch or second pressure is removed.

The temporary mode switching can be performed by first control information received from the digital device connected to the text input device integrated with a pointing device in a wired or wireless manner.

The permanent mode switching can be performed by second control information received from the digital device connected to the text input device integrated with a pointing device in a wired or wireless manner.

The mode switching unit 103 may be formed integrally with the pointer execution instruction unit.

For example, temporary mode switching may be performed from the text input mode to the pointer location information input mode when the first touch or first pressure is sensed on the pointer execution instruction unit, a pointer execution instruction may be generated when the second touch or second pressure is sensed, and the permanent switching mode may be set when a third touch or third pressure is applied, so as to operate in the pointer location information input mode even when the third touch or third pressure is removed.

In this case, the pointer execution instruction may be input in the permanent switching mode.

Mode switching units 106a and 106b may be provided to a left side or a right side of the housing.

The mode switching units 106a and 106b provided to the left side, right side, or both left and right sides may be formed of a virtual button or physical button so as to operate by sensing a user touch input or pressure.

The mode switching units 106a and 106b provided to the left side, right side, or both left and right sides may have an input region equal to or larger than 3 centimeters and smaller than 15 centimeters along the side surface of the housing.

The text input device integrated with a pointing device may include a transmitting unit 104 for transmitting data wiredly or wirelessly to the outside or a digital device having the text input device integrated with a pointing device.

The digital device may receive text input or pointer location information.

Figure 2:
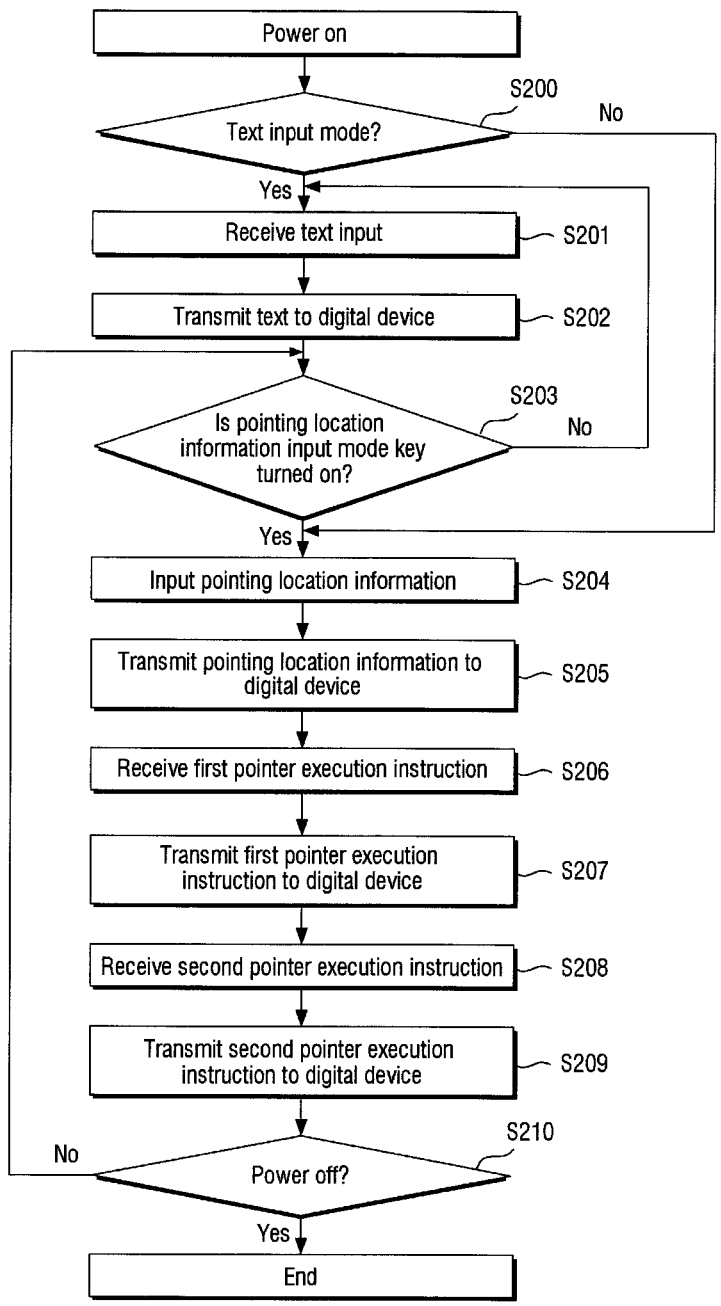
FIG. 2 is flowchart illustrating an exemplary embodiment of an operation sequence according to mode switching between a pointing device and a text device.

FIG. 2 is flowchart illustrating an exemplary embodiment of an operation sequence according to mode switching between a pointing device and a text device.

The text input device integrated with a pointing device may have a separate power unit, or receive power wiredly or wirelessly from an external source, and have a separate switch for controlling the power unit.

When power is supplied to the text input device integrated with a pointing device by the switch for controlling the power unit, it may be determined whether the text input device integrated with a pointing device is currently in a text input mode or a pointing location information input mode (200).

If it is determined that the text input device integrated with a pointing device is in a text input mode, the text input device integrated with a pointing device may be activated to receive text input from a user (201).

The text input from the user may be transmitted to the digital device which is connected in a wired or wireless manner.

The text input mode may be switched to the pointing location information input mode during an operation of the text input device integrated with a pointing device in the text input mode.

Alternatively, a text input operation and a pointing location information input operation may be simultaneously performed.

When the mode is switched to the pointing location information input mode, pointing location information may be input from a user (204).

The input pointing location information may be transmitted to the digital device which is connected in a wired or wireless manner (205).

When the text input device integrated with a pointing device receives a first pointer execution instruction (206), the text input device integrated with a pointing device may transmit the received first pointer execution instruction to the digital device which is connected in a wired or wireless manner (207).

When the text input device integrated with a pointing device receives a second pointer execution instruction (208), the text input device integrated with a pointing device may transmit the received second pointer execution instruction to the digital device which is connected in a wired or wireless manner (209).

When temporary mode switching or permanent mode switching is cancelled, the text input device integrated with a pointing device may be switched to a text input mode.

The operation may end when power of the text input device integrated with a pointing device is cut off by the power switch of the power unit, when no digital device is connected, when disconnected, when user input is absent for a certain time, or by a control of the digital device which is connected in a wired or wireless manner.

Figure 3:
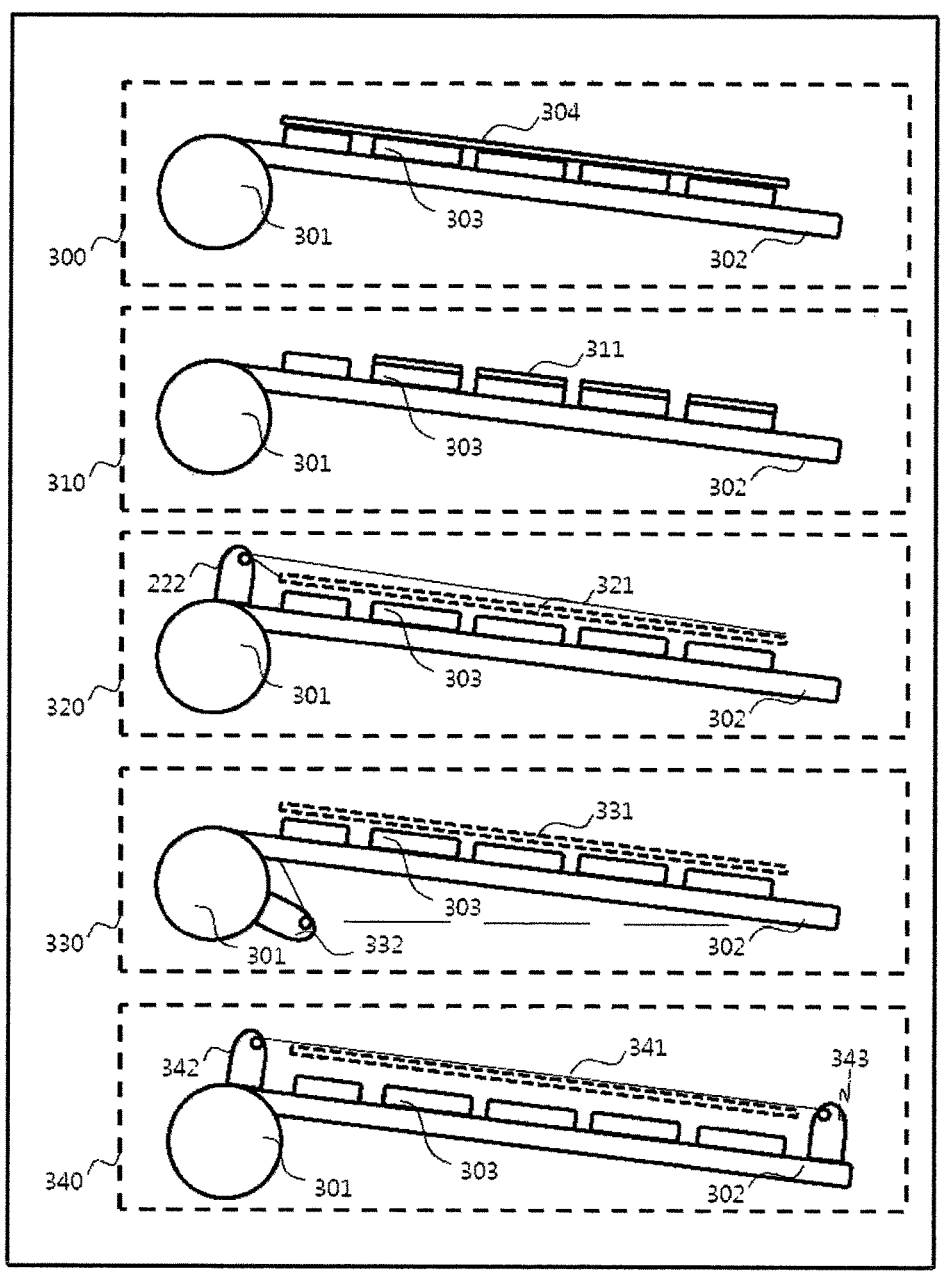
FIG. 3 illustrates exemplary embodiments of configurations of text input devices and pointing devices.

FIG. 3 illustrates exemplary embodiments of configurations of text input devices and pointing devices.

The text input device integrated with a pointing device may include a first housing 301 including a power unit, a control unit, a communication unit or the like; and a second housing 302 having a text input region and a pointing location information input region.

The text input device integrated with a pointing device may have a text input device and a text input region 303 for receiving text input from a user.

The text input region 303 may be formed of a virtual button or a physical button.

The pointing location information input device may be formed into a form of a pressure sensing or capacitive touch pad and positioned on the physical button of the text input device (304).

When the text input device is formed into a form of a physical touch pad such as a pressure sensing or capacitive touch pad, the touch pad may be used as a text input device and a pointing location information input device of which modes may be switched by the mode switching unit.

The physical touch pad such as a pressure sensing or capacitive touch pad may be used as a large-area touch pad type text input device integrated with a pointing device 300 formed of a touch pad 304 including a plurality of text button regions of a text input unit.

Alternatively, the physical touch pad such as a pressure sensing or capacitive touch pad may be used as a multi-touch pad type text input device integrated with a pointing device 310 formed of a plurality of touch pads 311 including one text button region of a text input unit.

Alternatively, the physical touch pad may be used as a top camera type text input device integrated with a pointing device 320 which receives (321) a pointing location information input by an infrared camera or an RGB camera 222 provided on a top of the pointing location information input region.

The top camera type text input device integrated with a pointing device 320 may form a virtual text input button 303 by using the top camera.

The physical touch pad may be used as a bottom camera 332 type text input device integrated with a pointing device 330 in which the camera is provided at a bottom of the second housing so as to receive (331) a pointing location information input.

The bottom camera type text input device integrated with a pointing device 330 may form the virtual text input button 303 substituting for a physical text button by using the bottom camera.

The physical touch pad may be used as a transmitting/receiving text input device integrated with a pointing device 340 which receives a pointing location information input through a virtual pointing location information input region 341 formed of a pair of infrared ray receivers or ultrasonic receivers for receiving information in which infrared rays or ultrasonic waves transmitted from an infrared ray transmitter or an ultrasonic receiver are blocked or interfered with a part of user body.

The virtual pointing location information input region 341 formed of a pair of infrared ray receivers or ultrasonic receivers may be used as a virtual text button input means in place of a physical text button by the mode switching unit.

Figure 4:
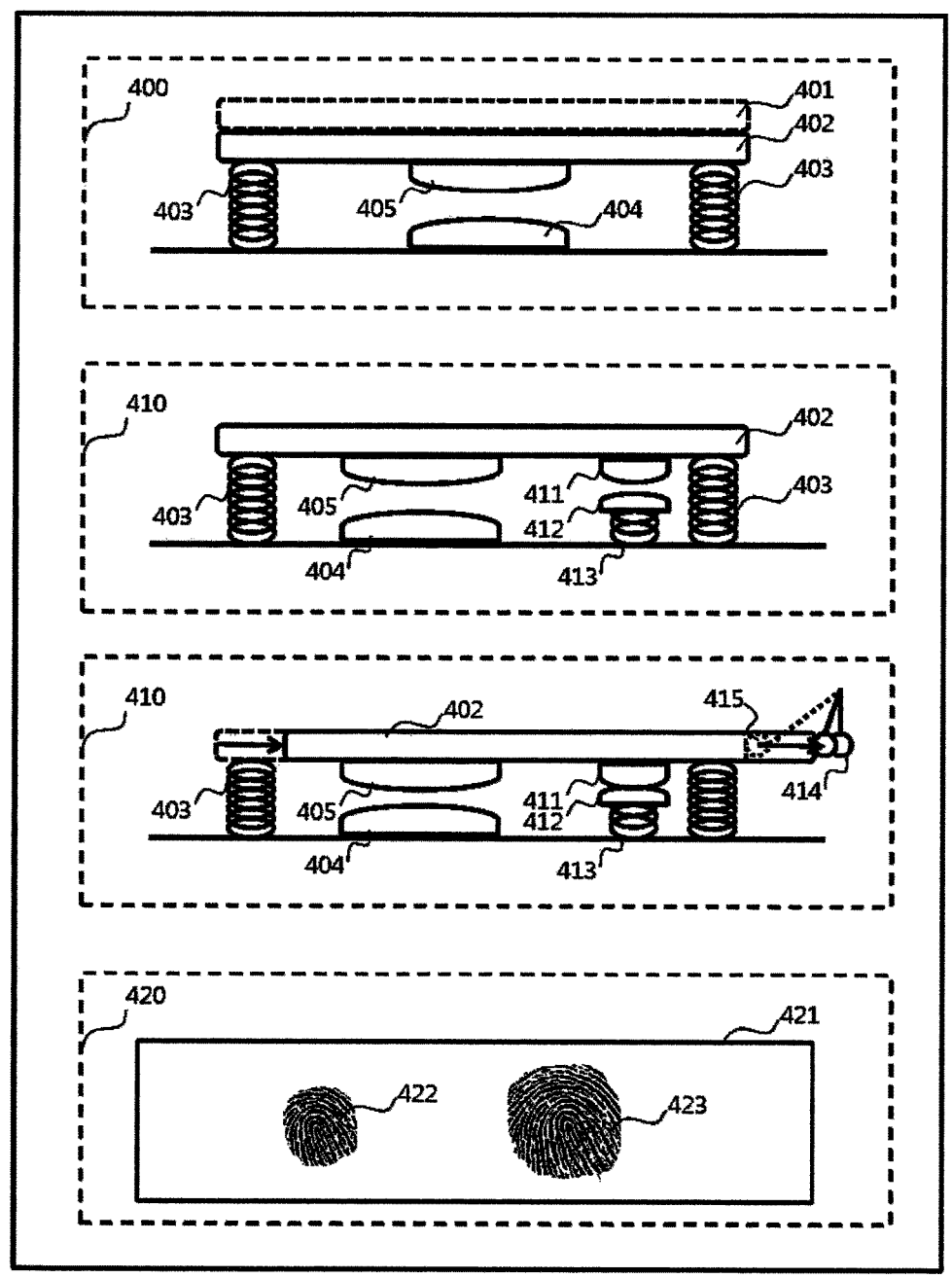
FIG. 4 illustrates exemplary embodiments of a mode switching unit integrated with a pointer execution instruction unit.

FIG. 4 illustrates exemplary embodiments of a mode switching unit integrated with a pointer execution instruction unit.

A mode switching unit integrated with a pointer execution instruction unit 400 using a touch input includes a button type pointer execution instruction unit including an elastic body 403 moving by pressure applied from a user and returning to an original location when the pressure is removed; a button 402 for receiving the pressure applied from the user; and switches 404 and 405 moving and contacting each other by the pressure from the user so as to generate a pointer execution instruction, and a mode switching unit 401 is provided on a top of the button 402 so as to sense an input of user touch and switch between a text mode and a pointing location information input mode.

A pressure-discriminating mode switching unit integrated with a pointer execution instruction unit 410 includes a button type pointer execution instruction unit including the elastic body 403 moving by pressure applied from a user and returning to an original location when the pressure is removed; the button 402 for receiving the pressure applied from the user; first switches 404 and 405 moving and contacting each other by first pressure from the user so as to generate a pointer execution instruction; and second switches 411 and 412 contacting each other by second pressure from the user smaller than the first pressure from the user so as to generate a mode switching execution instruction.

The button 402 may move and be fixed such that the button 402 may not return to its original location by the elastic body 403 in the pressure-discriminating mode switching unit integrated with a pointer execution instruction unit 410.

In this case, the button 402 may be fixed at a location in which the second switches 411 and 412 contact each other but the first switches 404 and 405 do not contact each other so as to operate in a permanent switching mode when the button 402 is fixed.

The mode switching unit integrated with a pointer execution instruction unit 400 using a touch input may be configured to operate a permanent mode switching switch 414 by an operation such as button sliding, and the pointer execution instruction switches 404 and 405 operate when additional pressure is applied while operating the permanent mode switching switch 414.

The mode switching unit integrated with a pointer execution instruction unit 410 may be formed of a touch pad 421 which operates as a mode switching unit when an area of a part of user body contacting the touch pad 421 is within a first predetermined range and as a pointer execution instruction unit when the area is within a second predetermined range.

Figure 5:
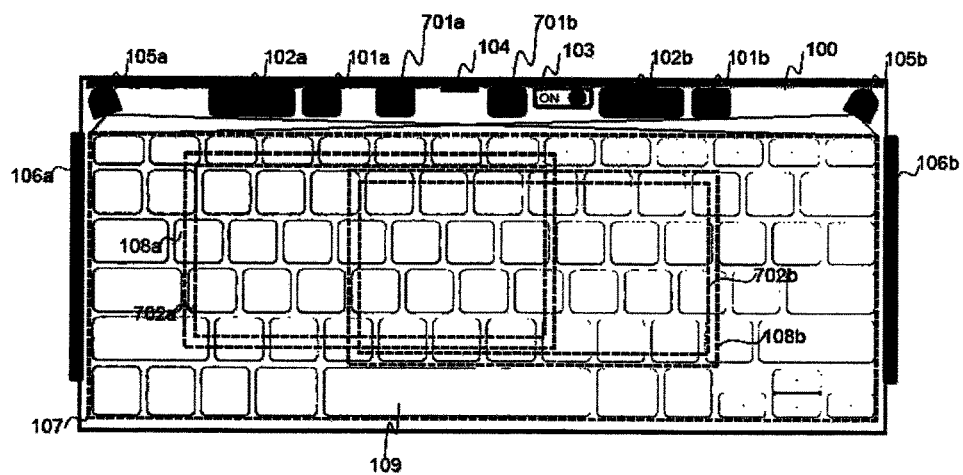
FIG. 5 illustrates an exemplary embodiment of a pointer location information input region.

FIG. 5 illustrates an exemplary embodiment of a pointer location information input region.

A human interface device of the present inventive concept may be designed to further include pointer location information input region display units 701 and 701 for visually displaying the pointer location information input region in a pointer location information input mode.

A mode switching unit of the present inventive concept may be provided separately from the button of the text input unit, and designed to recognize that a part of user body touches a part of a human interface body and switch between the text input mode and the pointer location information input mode, such that the human interface operates in the pointer location information input mode when the part of user body touches and in the text input mode when the part of user body does not touch.

In this case, the mode switching unit may be designed such that, if the part of user body used for the mode switching is a right hand (106*b*), then a left hand may input the pointer location information (108*a*).

In this case, it may be preferable that the pointer location information input region is closer to the edge opposite to the edge at which the mode switching unit is positioned, and if a user uses his/her left hand and right hand contrariwise, the mode switching unit may be designed following the same principle (106*a* and 108*b*).

The mode switching unit may be designed such that the part of user body used for the mode switching is a right hand and the right hand also inputs the pointer location information.

In this case, it may be preferable that the pointer location information input region is closer to the edge at which the mode switching unit is positioned than to the edge opposite to the edge at which the mode switching unit is positioned, and if the part of user body used for the mode switching is a left hand and the left hand also inputs the pointer location information, the mode switching unit may be designed following the same principle.

The mode switching unit may determine the text input mode and the pointer location information input mode by the number of the fingers of the user recognized by the pointer location information input unit.

The number of the fingers of the user recognized as the pointer location information input mode may be smaller than the number of the fingers of the user recognized as the text input mode.

For example, a left finger may not touch the text input button and a right index finger may touch the button for inputting pointer location information while controlling the mode switching unit by a left hand, and in this case, the number of the fingers of the user recognized may be one.

On the contrary, when the fingers of the left hand and right hand touch a keyboard so as to input text, the number of the fingers of the user recognized may be two to eight.

The pointer location information input mode display unit may temporarily display a pointer location information input mode when a mode is switched to the pointer location information input mode by the mode switching unit, or may visually display the pointer location information input region from the time of switching to the pointer location information input mode to the time of cancellation.

The pointer location information input mode display unit may display the mode by the reflected light from the text input button or by the text input button by a visible ray generator, or through spacing between the text input buttons.

The pointer location information input mode display unit may include invisible ray generators 701a and 701b, and surfaces 702a and 702b on which dye optically reacting to the invisible rays so as to emit visible rays is applied, and the dye may be applied to the text input button or the spacing between the text input buttons.

The mode switching unit may further include a hand side determination unit for determining whether the user inputs the pointer location information by the left hand or the right hand.

The display region of the pointer location information input mode display unit may be flexibly displayed according to the determination of the hand side determination unit.

The arrangement and operation of the buttons of the pointer execution instruction unit may be fluidly switched according to the determination of the hand side determination unit.

For example, if the pointer execution instruction unit includes a mouse right click and a mouse left click, the button to perform the mouse right click and the mouse left click may be switched according to the determination of the hand side determination unit.

The pointer location information input region display unit may display different pointer location information input regions (702a and 702b) according to the determination result of the hand side determination unit.

The mode switching unit may be designed to automatically switch to the text input mode when the pointer location information is not inputted from a user for a predetermined time or an input is received through the text input button during the pointer location information input mode.

The pointer location information input region display unit may be configured in that dye is applied to a part of the text input button or the text input region so as to visually display regardless of the mode switched by the mode switching unit, such that the pointer input region can be recognized during the text input mode.

Figure 6:
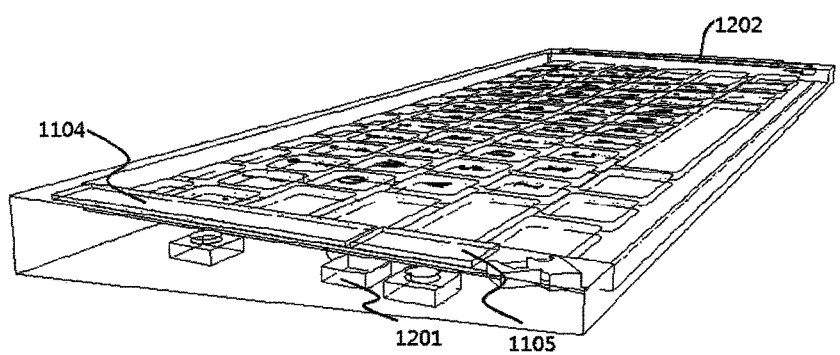
FIG. 6 illustrates an exemplary embodiment of a mode switching unit integrated with a pointer execution instruction unit.

FIG. 6 illustrates an exemplary embodiment of a mode switching unit integrated with a pointer execution instruction unit.

An inputting operation which requires frequent switching between the text input mode and the pointer location information input mode also requires increased frequency of mode switching and pointer execution instruction inputting.

For example, when a right-handed user intends to input pointer location information while inputting text in a text input mode, the user needs to switch the mode by the left or right hand, input the pointer location information, and then input the pointer execution instruction to the pointer execution instruction unit by the left hand.

In general, users may input text, pointer location information, and pointer execution instruction with their eyes kept on a monitor in a busy working environment, and when the mode switching unit and the pointer execution instruction input unit are provided separately from each other, the users need to move their hands frequently, and thus the users may not find an accurate location, resulting in a failure of work performance, or the users may need to see the keyboard, making work troublesome.

To solve these problems, if a right-handed user, for example, puts, after inputting text in a text input mode, his/her left hand on the mode switching unit, a mode switching instruction is generated to switch to a pointer input mode. Furthermore, if the user inputs pointer location information by his/her right hand with his/her left hand kept on the mode switching unit, and then applies pressure to the mode switching unit, the pointer execution instruction unit receives input of the user.

Thus, users may share the location of the mode switching unit for mode switching and the location of the pointer execution instruction unit for pointer execution instruction.

As one exemplary embodiment, the mode switching unit may be formed of a touch switch capable of receiving an input of a user hand touch, and the pointer execution instruction unit may be formed of a switch reacting to pressure such as a tact switch, and positioned beneath the mode switching unit.

A first pointer execution instruction unit 1104 and a second pointer execution instruction unit 1105 may be interconnected by a conductor material capable of recognizing a touch from a user hand, or commonly connected to a mode switching unit 1201 such that mode switching can be performed identically when the user touches either the first pointer execution instruction unit 1104 or the second pointer execution instruction unit 1105.

In this case, an operation is performed in a pointer location information input mode during a touch, and in a text input mode when the touch is cancelled.

A mode switching operation by a touch may be performed by a switch other than the touch, operating with pressure smaller than the pressure for a pointer execution instruction, or a sensor capable of sensing the location of user's finger.

In this case, the mode switching unit and the pointer execution instruction unit may be disposed in a region different from the text input region. Preferably, for a right-handed person, the mode switching unit and the pointer execution instruction unit may be disposed in a left outside of the text input region. When the mode switching unit and the pointer execution instruction unit are disposed outside the text input region, the possibility of confusion arising from the pointer location information input unit and pointer location information input may be eliminated, and the pointer location information input region may be extended.

The multi-functional human interface device of the present inventive concept may include a second mode switching unit 1202. The second mode switching unit 1202 may operate together with a toggle switch, and switch between the text input mode and the pointer location information input mode whenever an input is received from a user. This enables the user to input pointer location information just by his/her right hand even when the left hand of the user is not in touch with the mode switching unit.

In this case, the multi-functional human interface device of the present inventive concept may operate in a pointer location information input mode upon receiving a mode switching instruction by a touch when the multi-functional human interface device is in a text mode by the second mode switching unit 1202. Furthermore, the multi-functional human interface device may be maintained in a pointer location information input mode upon receiving a mode switching instruction by a touch when the multi-functional human interface device is in a pointer location information input mode by the second mode switching unit 1202, but the multi-functional human interface device is switched to a text input mode when a mode switching instruction by a touch is cancelled or a text input is received through the text input unit.

When the multi-functional human interface device is switched to a text input mode by a text input, at least a first text input may be ignored, and the multi-functional human interface device may be switched to the text input mode upon receiving at least two text inputs.

When the multi-functional human interface device is switched to the text input mode upon receiving at least two text inputs, the multi-functional human interface device may transmit, to the digital device, text inputs including the ignored at least first text, and then transmit newly input text input information to the digital device.

Figure 7:
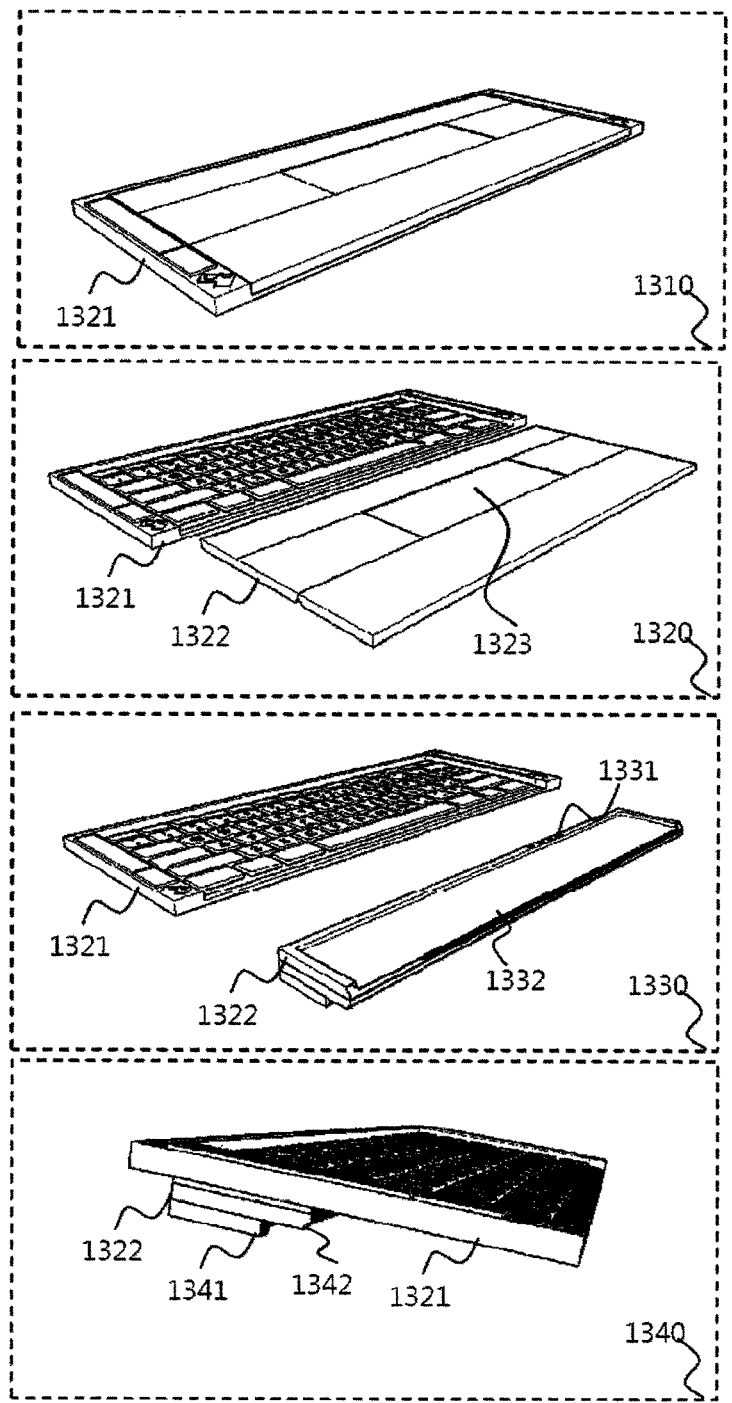
FIG. 7 illustrates an exemplary embodiment of a utilization of a human interface device cover adopting a bottom-located pointer location information input device.

FIG. 7 illustrates an exemplary embodiment of a utilization of a human interface device cover.

In the multi-functional human interface device, the pointer location information input device may require a space of at least 1 mm to 2 mm on a plane of the text input device formed into a physical device so as to form a pointer location information input region, and require a rim in which an absorber or a reflector for absorbing or reflecting an optical signal is positioned, at edges of at least three sides enclosing a text input region.

In this case, a gap of at least 1 mm to 2 mm is formed between the height of the rim of the at least three sides and the plane of the text input region, and a substantially rectangular space is formed in the gap.

The multi-functional human interface device of the present inventive concept may further include a multi-functional cover 1322 in the substantially rectangular space so as to protect the text input region from impact applied from outside (1310).

The multi-functional cover 1322 may be separated from the multi-functional human interface device, and may be coupled or decoupled to or from the multi-functional human interface device by a magnet or a physical structure.

The multi-functional cover 1322 may be foldable several times. Preferably, the multi-functional cover 1322 may have a twice-foldable structure, and the width of at least one of divided regions of the multi-functional cover 1322 may be narrower than the width of other regions (1341).

This may further reduce the slope of the multi-functional human interface device when the multi-functional cover 1322 is folded and disposed beneath the multi-functional human interface device so as to adjust the slope of the multi-functional human interface device.

When the multi-functional cover 1322 is folded and disposed beneath the multi-functional human interface device, the portion contacting the ground among the part of the folded surface may have a tilted surface (1342) for increasing an area contacting the ground.

The slope of the multi-functional human interface device may be adjusted according to a user's desire by the number of folding of the multi-functional cover 1322.

The multi-functional cover 1322 may have a built-in charge battery 1323 therein.

The charge battery 1323 may have power with an electrode which is disposed in a part of the region protruding further than a part covering the text input region, covering the rim of the part covering the text input region beneath the multi-functional cover 1322 (1331), and the power may be connected to an electrode provided on the top of the multi-functional human interface device when the text input device is covered with the multi-functional cover 1322 (1310).

When the multi-functional cover 1322 is folded and disposed beneath the multi-functional human interface device to as to adjust the slope of the multi-functional human interface device, the power of the charge battery 1323 may be connected to an electrode provided at a bottom surface of the multi-functional human interface device.

The multi-functional human interface device may be connected to external power so as to supply power to the charge battery 1323 in the multi-functional cover 1322 or separately charge the multi-functional cover 1322.

In this case, the bottom surface of the multi-functional human interface device may have a groove to which a magnet, a physical coupling device, or a cover is inserted such that the multi-functional human interface device can be coupled/decoupled, at an accurate location, to/from the protruded rim region in which the electrode 1331 is disposed and to/from a region 1332 covering the text input region having a gap difference from the protruded rim region.

A material capable of removing fine dust, oil stain, moisture, and the like can be applied to the rim of the multi-functional cover 1322, and thus foreign substances can be removed from an absorber plate, a reflector plate, an optical emitter, or a front surface of a camera when the multi-functional cover 1322 is attached/detached to/from the multi-functional human interface device.

When the text input region is covered with the multi-functional cover 1322, the cover may be detected so as to turn the power of the multi-functional human interface device off.

When the multi-functional cover 1322 is disposed on the bottom surface of the multi-functional human interface device, the power of the multi-functional human interface device may be turned on.

Furthermore, when a user input is absent for a predetermined time after power turn-on, the power may be cut off or a mode may be switched to a standby mode.

When the text input region is covered with the multi-functional cover 1322 (1310), a multi-functional human interface device 1321 may have a substantially thin rectangular plate shape, and may be designed to have no slope when put on the ground, thereby maximizing aesthetic effects and improving portability.

When the multi-functional cover 1322 is folded and disposed at the bottom surface of the multi-functional human interface device, the multi-functional human interface device may have a slope similar to those of general keyboards.

The multi-functional cover 1322 may be attachable/detachable, but alternatively, may be designed to descend round from the top to the bottom of the multi-functional human interface device by a hinge and folded.

Figure 8:
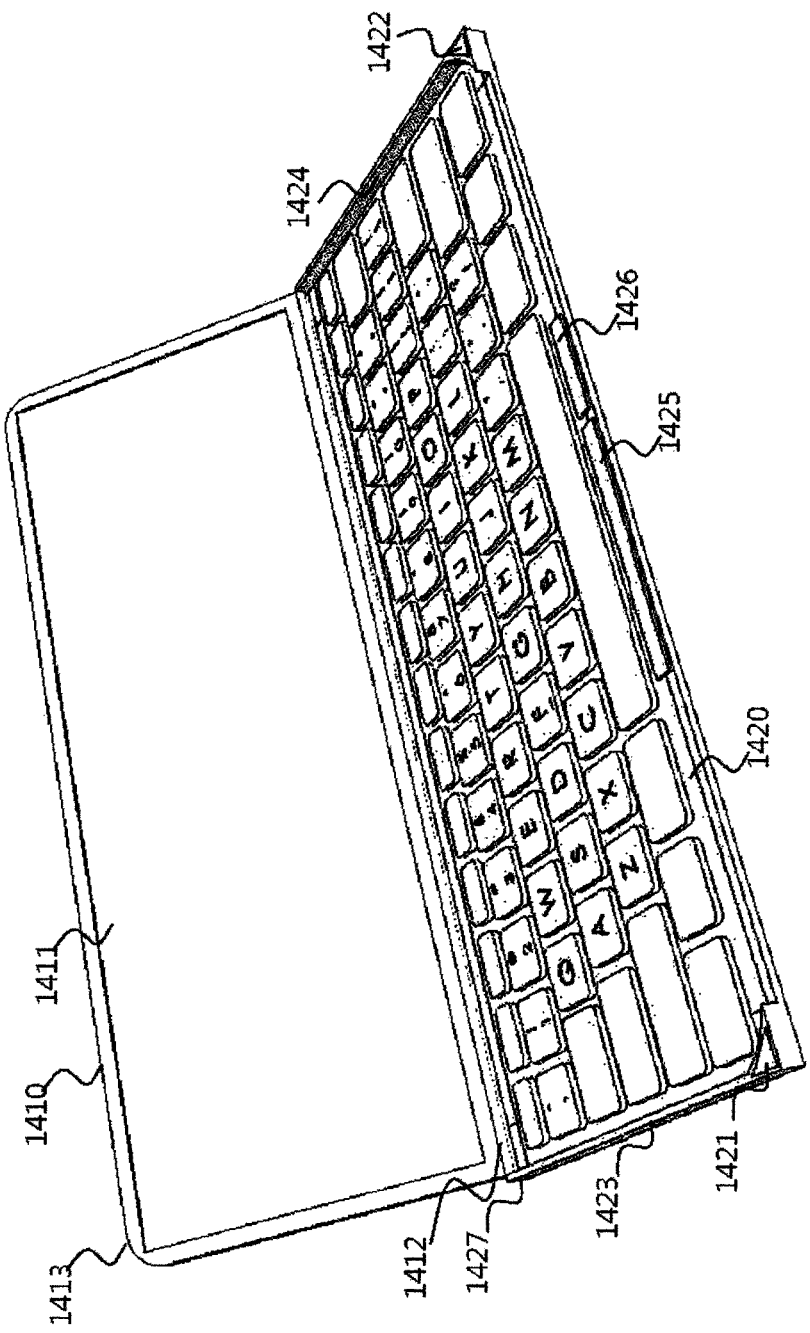
FIG. 8 illustrates an exemplary embodiment of a human interface device applied to a portable notebook.

FIG. 8 illustrates an exemplary embodiment of a human interface device applied to a portable notebook.

A human interface device 1420 of the present inventive concept may be used as an input device of a portable notebook.

The portable notebook having the human interface device of the present inventive concept may be designed in that a display unit including a display panel 1411 and a frame 1410 supporting the display panel 1411 is connected to the human interface device of the present inventive concept by a hinge 1427 such that the portable notebook can be folded and unfolded.

In this case, the display unit may be inserted to an inside of a wall formed by a reflector plate or absorber plate 1424 of the human interface device of the present inventive concept. Thus, the thickness of the portable notebook using the human interface device of the present inventive concept may be minimized.

To this end, the display unit of the portable notebook may have a width that needs to be at least two times thickness of the reflector plate 1423 or absorber plate 1424 shorter than the width of the human interface device 1420 of the present inventive concept.

Figure 13:
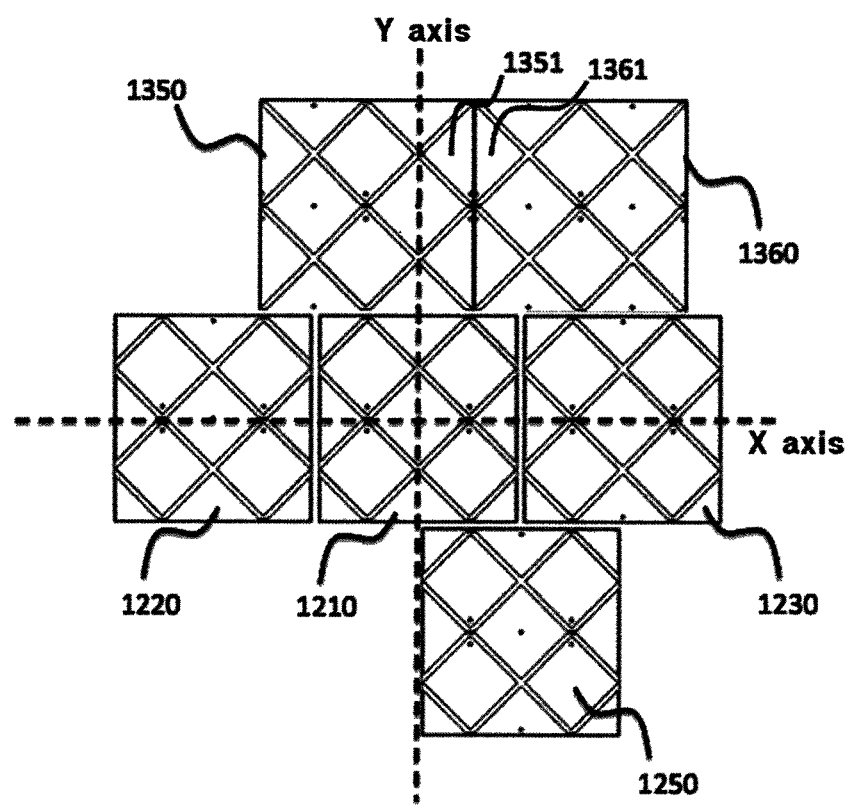
FIG. 13 illustrates an exemplary embodiment of an arrangement of electrodes of multi-functional input buttons having different patterns.

That is, the display unit needs to be designed so as to be inserted into the place in which the multi-functional cover is inserted, as shown in FIG. 13.

The display unit may have both corners rounded or diagonally cut (1413).

Pointer location information input devices 1421 and 1422 may be positioned outside the rounded or diagonally cut corners of the display unit when the display unit is folded.

Thus, the portable notebook may maintain its thickness thin without being interfered with the pointer location information input devices 1421 and 1422 when the portable notebook is folded.

In this case, a mode switching unit and a pointer execution instruction unit may be provided outside a side surface of the human interface device.

More preferably, the mode switching unit and the pointer execution instruction unit may be provided outside down the text input region (1425 and 1426).

Figure 12:
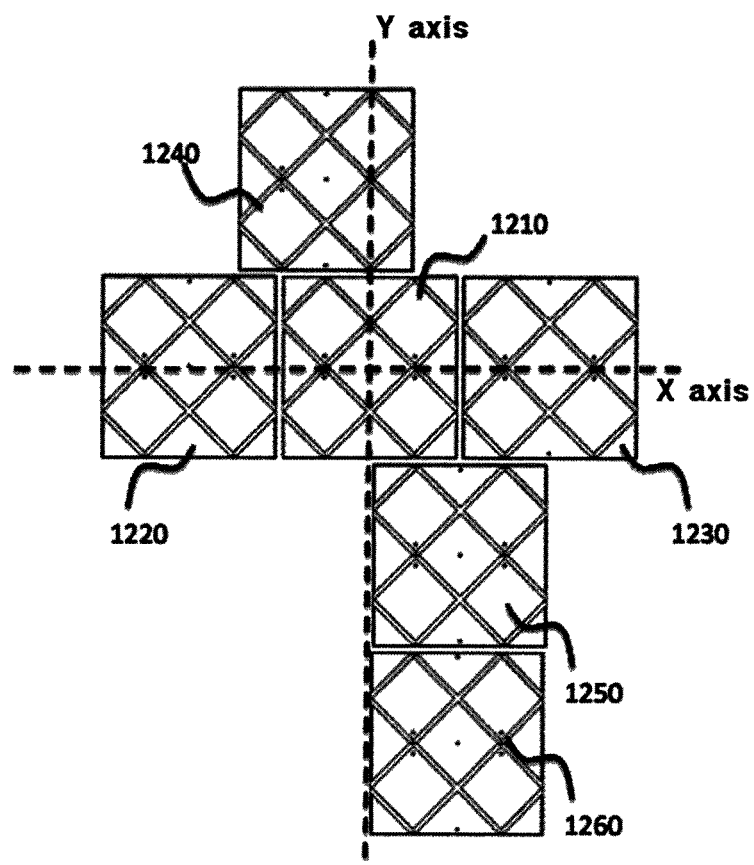
FIG. 12 illustrates an exemplary embodiment of an arrangement of multi-functional input buttons.

In this case, it may be preferable that the mode switching unit and the pointer execution instruction unit are integrally formed, as shown in FIG. 12, but the mode switching unit and the pointer execution instruction unit may be separated from each other.

In case the mode switching unit or the pointer execution instruction unit is provided outside down the text input region, the pointer location information input region needs to be set in an area excluding the area in which the mode switching unit or the pointer execution instruction unit is provided, so as to prevent the location information input devices 1421 and 1422 from erroneously operating with a misdetection that a user inputs pointer location information, when the user puts his/her finger on the mode switching unit or the pointer execution instruction unit so as to control the mode switching unit or the pointer execution instruction unit.

To this end, an area covered by an optical signal generated from a pointer location information input device may be adjusted such that the optical signal cannot arrive the mode switching unit or the pointer execution instruction unit.

Alternatively, an optical signal receiving angle of a camera may be adjusted, or the camera may be set to ignore an optical signal received in a corresponding direction such that the camera cannot receive the optical signal generated by a reflection, an interference, or blocking between the optical signal and user's finger positioned on the mode switching unit or the pointer execution instruction unit.

The portable notebook may be designed to have, on at least three edges thereof, an absorber plate or a reflector plate for absorbing or reflecting a light generated from the pointer location information input device.

In this case, the reflectors or the absorbers may be disposed at two edges of the respective side surfaces of the human interface device (1423 and 1424), and disposed in a predetermined region 1412 at the rest of the three edges where the display unit contacts the human interface device such that the light generated by the pointer location information input devices 1421 and 1422 can be fully reflected or absorbed when the display unit is opened within a predetermined angle.

Figure 9:
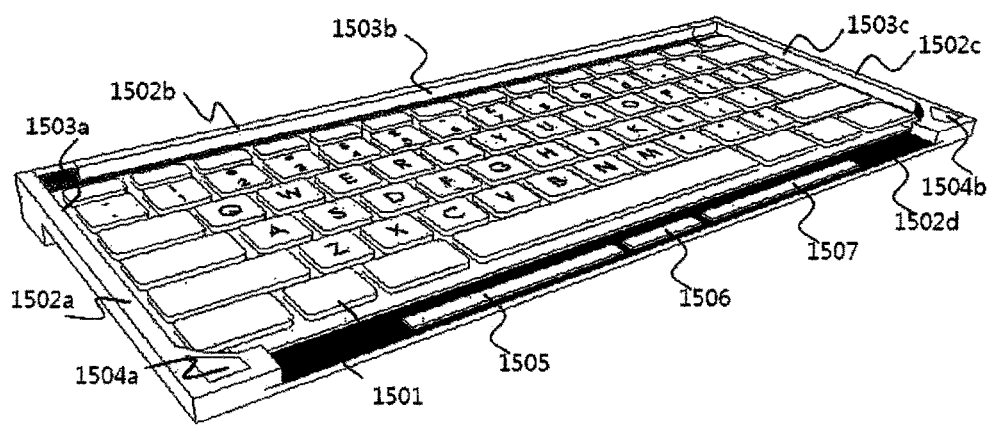
FIG. 9 illustrates an exemplary embodiment adopting a bottom-located pointer location information input device and a bottom-located pointer execution instruction unit.

FIG. 9 illustrates an exemplary embodiment adopting a bottom-located pointer location information input device and a bottom-located pointer execution instruction unit.

A human interface device may include a text input unit 1501 formed of a plurality of physical buttons; a pointer location information input unit for receiving, from a user, information related to a pointer location; a pointer execution instruction receiving unit for receiving signals of pointer execution instruction units 1505 and 1506 for receiving user instruction so as to perform at least one function at the pointer location; a mode switching instruction receiving unit for receiving a signal of a mode switching unit for switching to a pointer location information input mode; and a pointer location information transmitting unit for transmitting the information related to the pointer location, input to the pointer location information input unit, to a digital device connected to the human interface device in a wired or wireless manner, wherein the pointer location information input unit may have a pointer location information input region disposed to be parallel to a top of at least a part of a text input region of the text input unit formed of a plurality of physical buttons, and the pointer location information input unit may include, at first to third surfaces thereof 1502a, 1502b and 1502c enclosing the text input unit, optical signal reflectors or absorbers 1503a, 1503b and 1503c formed higher than a height of the text input unit, and a fourth surface 1502d enclosing the text input unit is formed lower than height of the first to third surfaces, and the fourth surface 1502d may include the pointer execution instruction units 1505 and 1506. The first and third surfaces may be disposed respectively at left and right sides of the text input unit, the second surface may be disposed on the text input unit, and the fourth surface may be disposed beneath the text input unit.

The pointer location information input unit may include at least two sensor modules, and the two sensor modules may be disposed respectively at edges of left and right lower ends of the text input unit.

The mode switching unit may operate by a first user input inputted to a first button, and the pointer execution instruction receiving unit may operate by a second user input inputted to the first button.

The first button may be made of a material capable of sensing an electrical signal generated by a finger touch, and the first input may be generated by detecting the electrical signal.

The mode switching unit may operate in the pointer location information input mode during maintenance of the first input, and cancel the pointer location information input mode when the first input is cancelled, and the first input may be generated by physical pressure.

The mode switching unit may operate by a second user input inputted to a second button, and, when the second input is inputted one time, activate the pointer location information input mode if the pointer location information input mode is cancelled, and cancel the pointer location information input mode if the pointer location information input mode is activated.

In this case, it may be preferable that light generated by the pointer location information input devices 1421 and 1422, and an image receiving device are directed toward a center of a keyboard.

When the keyboard is small, or to ensure a wider pointer location information input region, the reflector plate rather than the absorber plate among the reflector plate or the reflector plate 1423 and 1424 positioned at a side surface of the human interface device may be used, and the light generated by the pointer location information input devices 1421 and 1422, and the image receiving device may be directed toward the reflector plate 1423 and 1424.

That is, the pointer location information input device 1421 may receive pointer location information reflected by the reflector plate 1423.

The pointer location information input device 1422 may receive pointer location information reflected by the reflector plate 1424.

Thus, an effect of enabling the pointer location information input devices 1421 and 1422 to be located in left and right outsides of an actual multi-functional human interface device can be obtained, providing a wider mouse pointer location information input region.

In this case, the reflector plate 1423 and 1424 may be provided to have an angle opened at a predetermined angle of 1 to 15 degrees. That is, the reflector plate 1423 and 1424 may be arranged such that a bottom thereof opens wider than a top thereof.

Thus, an effect of enabling the pointer location information input devices 1421 and 1422 to be located in left and right outsides of an actual multi-functional human interface device can be obtained, and an effect of enabling the pointer location information input devices 1421 and 1422 to move upwardly by a predetermined distance so as not to be interfered with the pointer execution instruction input device located at a bottom of the keyboard can be obtained.

The multi-functional human interface device may include reflection units for reflecting light generated from the pointer location information input units, at least two pointer location information input units may be provided respectively at left and right sides of the human interface device, the reflection units may be provided respectively at left and right sides of the human interface device, and the left pointer location information input unit may be directed toward the left reflection unit so as to receive light input through the left reflection unit, and the right pointer location information input unit may be directed toward the right reflection unit so as to receive light input through the right reflection unit.

The left and right reflection units may not be parallel to each other and may be opened toward areas in which the left and right pointer location information input units are disposed.

The pointer location information input region may be divided into a first region and a second region. That is, a pointer location information input signal from a right hand may be received from the first region, and a pointer location information input signal from a left hand may be received from the second region.

In general, a multi-touch control may receive a plurality of touch input signals, and determine a control command according to an aspect of further movement of the plurality of touch input signals.

However, in the present exemplary embodiment, a first pointer location information input signal received from the first pointer location information input region may be used in identifying the number of touch inputs.

Furthermore, a second pointer location information input signal received from the second pointer location information input region may be used in receiving a touch input movement signal.

That is, for example, when a vertical sliding touch is input by using one right finger with left two fingers kept on touch inputting, the signal generated from this operation can be replaced by two touch signals having a general multi-touch function, used in a vertical touch input. In general, performing vertical scrolling on Internet browser may be an example of performing a vertical sliding touch input by two touches in Macbook of Apple Inc. In this case, when one right finger taps, the left hand performs two touch inputs, and thus the performance would be the same as tapping with two fingers.

For another example, when a horizontal sliding touch is input by using the right hand with left three fingers kept on touch inputting, the signal generated from this operation can be replaced by three touch signals having a general multi-touch function, used in a horizontal sliding touch input. In general, performing functions such as swipe on a whole screen application or dragging by three fingers may be an example of performing a horizontal sliding touch input by three touches in Macbook of Apple Inc. In this case, when one right finger taps, the left hand performs three touch inputs, and thus the performance would be the same as those of tapping with three fingers. The example of the left hand and right hand may be replaced by the example of the right hand and left hand, and the number of input signals for determining the number of touches is not limited to two or three described above, but includes one, four, or five touches.

The information related to the pointer location received by the pointer location information input unit may include information related to a first pointer location for moving the pointer location, and information related to a second pointer location for switching from a text input mode to a pointer location information input mode in the human interface device.

For example, when a pointer location information input signal higher than a preset threshold level is generated in a text input mode, the mode may be switched to a pointer location information input mode.

Figure 10:
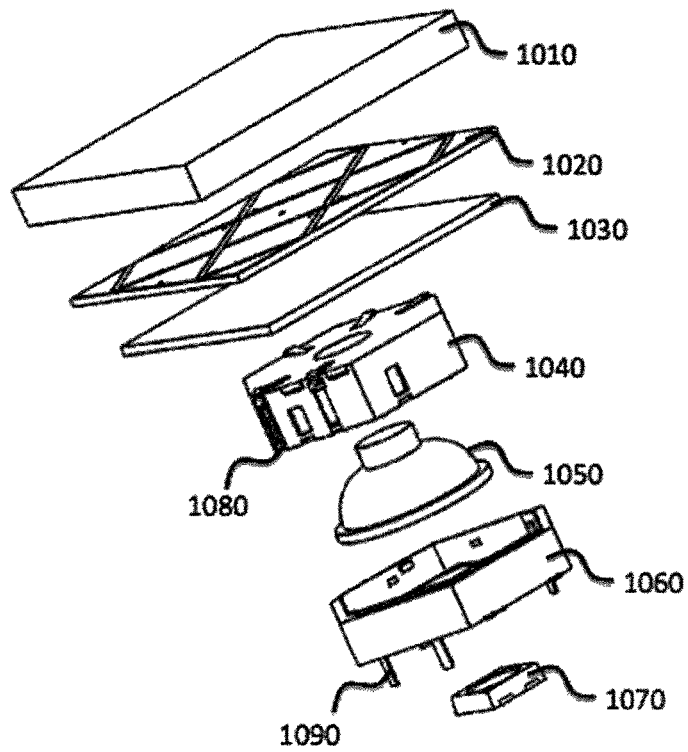
FIG. 10 is an exploded perspective view illustrating a multi-functional input button.

FIG. 10 is an exploded perspective view illustrating a multi-functional input button.

The multi-functional input button may form the text input device integrated with a pointing device 310 in a human interface such as a keyboard, including: a text input unit 303 for inputting at least one text; and a physical touch pad 311 such as a capacitive pad for moving a mouse pointer or inputting pointing location information for inputting a user touch or 3D gesture on a screen.

The present exemplary embodiment describes a capacitive touch method useful in a pointing location information input unit, but the mode switching unit, the pointer execution instruction input unit, special function keys, locations of the mode switching unit and the pointer execution instruction unit, the connection to the inner or outer display unit, the battery embedding method using the cover unit, the function of adjusting the angle of the human interface device, the text input region, the mouse pointing location information input region, and the like of the multi-functional human interface device described above by using the pointing location information input unit adopting an optical method can be applied the same to the present exemplary embodiment.

The text input device integrated with a pointing device 310 may be formed of a plurality of multi-functional input buttons.

The multi-functional input button may include a cover unit 1010 on which user's finger touch is performed; an electrode unit 1020 including a transmitter and a receiver for generating an electrical field; and a base unit 1030 for protecting the electrode unit and ensuring connectivity to an elastic unit.

The elastic unit may include an elastic body 1050, an upper support unit 1040, and a lower support unit 1060.

The upper support unit and the lower support unit may be formed into a cylindrical or polygonal body shape, and may move location thereof through the elastic body, and the lower support unit may guide the movement of the upper support unit.

The upper support unit may be fixed to the cover unit, the electrode unit, and the base unit.

The lower support unit may serve as a guide for a reciprocation of the upper support unit.

The upper support unit and the lower support unit may have a pantograph structure, interconnect an upper structure including the electrode unit and a lower structure including the elastic unit, and guide the movement of the upper structure.

The elastic body may be a dome-shaped elastic material having restoring force, a plate-shaped elastic material having restoring force, a spring-shaped elastic material, a plurality of magnets having different polarities facing each other, and a combination thereof.

The elastic unit may receive second pressure from the cover unit so as to move to a third height, and return to a first height when the second pressure of the second cover unit is cancelled. Moving to the third height may mean a physical movement, bending of an object by pressure, or sensing the second pressure by software and the like.

A pointer execution instruction may be generated upon sensing of the first pressure, and an additional pointer execution instruction may be generated upon sensing of the second pressure.

For example, an application execution instruction may be displayed at a pointer location by the first pressure, and an additional option, a preview and the like of the application may be performed by the second pressure.

An electrical signal indicating an input of a predetermined character generated through the switch of the first to fifth multi-functional input buttons may indicate an input of different characters, and a contact location of the user finger or a change in the contact location determined from the signal received through the electrode unit of the first to fifth multi-functional input buttons may intend to successively control the locations of one pointer.

The human interface device may further include a mode switching unit for switching between a text input mode and a pointing location information input mode.

The mode switching unit may operate by the multi-functional input button, a separate physical switch unit, a touch switch unit, or a predetermined touch pattern.

The human interface device may generate pointing location information for controlling successively one pointing input device on a character input device formed of a plurality of combinations of multi-functional input buttons capable of inputting one character and an electrode of the plurality of multi-functional input buttons.

The human interface device may include the mode switching unit and the pointer execution instruction unit separately from the plurality of multi-functional input buttons.

The mode switching unit and the pointer execution instruction unit may be one button formed of an electrode capable of recognizing a user touch and a switch, and may generate a pointer execution instruction by a pressure signal without the need of moving or taking off fingers after mode switching by a touch.

The multi-functional input buttons may include a light emitting unit 1070.

The light emitting unit 1070 may light characters indicating character input on the multi-functional input buttons, or may light locations of the multi-functional input buttons.

The light emitting unit may be disposed on the upper structure including the electrode unit, or a lower structure including the elastic body.

The upper structure may include the electrode unit, move by pressure from a user, and include the cover unit, the electrode unit, the base unit and the like.

The lower structure may be a part including a structure, which guides the movement of the upper structure and transmits or receives an electrical signal from the electrode unit, and not moving when pressure is applied from a user.

Figure 11:
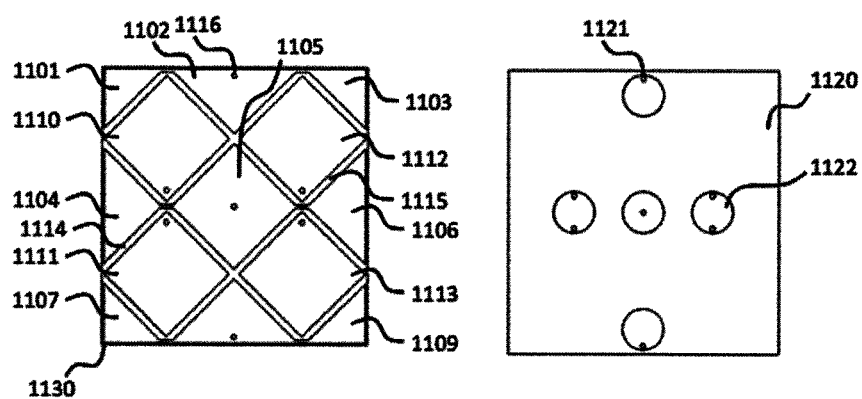
FIG. 11 illustrates an exemplary embodiment of an electrode of a multi-functional input button.

FIG. 11 illustrates an exemplary embodiment of an electrode of a multi-functional input button.

An electrode unit adopting a capacitive touch method may include a plurality of transmitters and receivers.

A general electrode unit adopting a capacitive touch method may have a square shape in which transmitters in 5 to 30 rows and receivers in 5 to 30 columns are arranged in a grid.

The multi-functional input buttons of the present exemplary embodiment may be formed of an electrode unit having a size same as that of one character input button having a width of 10 to 20 mm.

The electrode unit may form an independent small touch pad to be used as a pointing location information input device, and may cooperate with a plurality of multi-functional input buttons so as to be used as a connective pointing location information input device in a wider region.

The electrode unit may include one to three transmitters and receivers.

The electrode unit of one of the multi-functional input buttons of the present exemplary embodiment will be described by way of example of a multi-functional input button including three columns of transmitters having different driver signal periods and two rows of receivers having different scan periods.

In the present inventive concept, the number and shape of transmitters and receivers may be readily modified by a person skilled in the art according to the size and shape of the button.

The electrode unit may include first transmitters 1101, 1102 and 1103 having a first drive period, second transmitters 1104, 1105 and 1106 having a second drive period, and third transmitters 1107, 1108 and 1109 having a third drive period.

The electrode unit may include first receivers 1110 and 1111 having a first scan period, and second receivers 1112 and 1113 having a second scan period.

The first to third transmitters may be short-circuited from each other or connected into a single unit without a separate connection member on a circuit board.

The first and second receivers may be short-circuited from each other and printed on a circuit board and connected by a separate connection member, or may be arranged to be independently scanned with an electrical signal such as capacity during a scan period.

The electrode unit of the present exemplary embodiment may require a special design such that a plurality of electrode units of a plurality of multi-functional input buttons can be recognized as a single large-area electrode unit and each of the multi-functional input buttons can move upwards and downwards.

For example, the second transmitters may have a width wider than the sum of widths of the first and third transmitters.

The sum of widths of the first to third transmitters may be smaller than the sum of widths of the first and second receivers.

Receivers having one scan period may be interconnected in a general capacitive touch pad. In the present exemplary embodiment, the first receiver having one scan period may include at least two receiver blocks 1110 and 1111, and the at least two receiver blocks 1110 and 1111 may be short-circuited from each other and transmit a scan signal to an outside.

The scan signal may be processed by summing capacitive signals received from the respective receiver blocks.

Although, in the present exemplary embodiment, the transmitters are arranged in a column and the receivers are arranged in a row, the transmitters may be arranged in a row and the receiver may be arranged in a column in the same structure.

The transmitters and the receivers may be electrically short-circuited by insulators 1114 and 1115.

The electrode unit may include a bridge 1120 stacked or connected below so as to transmit and receive an external driver signal and a scan signal.

The bridge may transmit a driver signal to the electrode unit, and receive a capacitive signal from the receiver.

FIG. 12 illustrates an exemplary embodiment of an arrangement of multi-functional input buttons.

The multi-functional human interface device of the present exemplary embodiment may include at least five multi-functional input buttons.

A second multi-functional input button 1220 and a third multi-functional input button 1230 may be disposed respective at a left side and a right side of a first multi-functional input button 1210, a central point of the second multi-functional input button may be arranged on a virtual X-axis line extending leftward and rightward from a central point of the first multi-functional input button, and a central point of the third multi-functional input button may be arranged on a virtual X-axis line extending rightward from a central point of the first multi-functional input button.

The multi-functional human interface device may further include a fourth multi-functional input button 1240 and a fifth multi-functional input button 1250, and a central point of the forth multi-functional input button 1240 may be arranged at a left side from a virtual Y-axis extending upward from the central point of the first multi-functional input button and at a right side from a virtual Y-axis extending upward from the central point of the second multi-functional input button, and a central point of the fifth multi-functional input button 1250 may be arranged at a right side from a virtual Y-axis extending downward from the central point of the first multi-functional input button and at a left side from a virtual Y-axis extending downward from the central point of the third multi-functional input button, and the fourth and fifth multi-functional input buttons may be disposed adjacent to the first multi-functional input button.

The distance by which the central point of the fourth multi-functional input button 1240 is spaced leftward apart from the virtual Y-axis extending upward from the central point of the first multi-functional input button 1210 may be shorter than the distance by which the central point of the fifth multi-functional input button 1250 is spaced rightward apart from the virtual Y-axis extending downward from the central point of the first multi-functional input button 1210.

For example, the fifth multi-functional input button 1250 may be disposed at the location spaced rightward apart from the Y-axis by 40 to 60 percent of the width of the first multi-functional input button 1210.

The fourth multi-functional input button 1240 may be disposed at the location spaced leftward apart from the Y-axis as much as 15 to 35 percent of the width of the first multi-functional input button 1210.

The first transmitter of the first to third multi-functional input buttons may have a driver signal period same as that of the third transmitter of the fourth multi-functional input button 1240.

The second receiver of the first multi-functional input button 1210 may have a scan period same as that of the first receiver of the fifth multi-functional input button 1250.

The first receiver of the first multi-functional input button 1210 and the second receiver of the fifth multi-functional input button 1250 may have scan periods different from each other.

The second receiver of the first multi-functional input button 1210 and the second receiver of the fourth multi-functional input button 1240 may not be disposed in a row in the virtual Y-axis direction but may be moved leftward within the width of the first multi-functional input button 1210, and the second receiver of the first multi-functional input button 1210 and the second receiver of the fourth multi-functional input button 1240 may have the same scan period.

Consequently, pointing location information signal distortions may occur, which requires a step of correcting by software.

The human interface device may further include a sixth multi-functional input button 1260 having a central point disposed on a virtual Y-axis extending downward from the central point of the fifth multi-functional input button 1250.

FIG. 13 illustrates an exemplary embodiment of an arrangement of electrodes of multi-functional input buttons having different patterns.

The first multi-functional input button 1210 and the fourth multi-functional input button 1240 may not be disposed in a row on a virtual Y-axis but may be moved leftward as much as a first distance.

Thus, signal distortions may occur in the receivers of the first multi-functional input button 1210 and the fourth multi-functional input button 1240.

To prevent or minimize signal distortions, the fourth multi-functional input button 1240 may have a modified pattern.

For example, an electrode 1130 shown in FIG. 11 may have a pattern moved from a left side toward a right side of the electrode 1130 as much as the first distance so as to form a second electrode shape 1350.

The second electrode shape may provide an effect of aligning, on the virtual Y-axis, receivers of the first multi-functional input button and fourth multi-functional input button.

A seventh multi-functional input button 1360 having the second electrode shape may be disposed at a right side of the fourth multi-functional input button.

In this case, a receiver 1351 disposed at a rightmost side of the fourth multi-functional input button may have a scan period same as that of a receiver 1361 disposed at a leftmost side of the seventh multi-functional input button 1360. In this case, the second receivers 1112 and 1113 of the first multi-functional input button may also have the same scan period.

Figure 14:
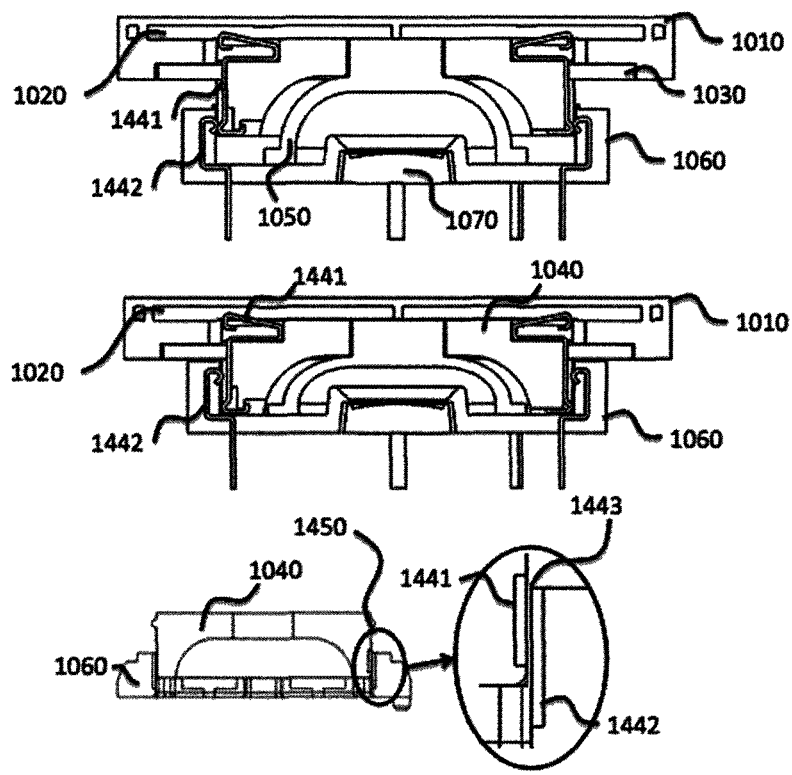
FIG. 14 illustrates exemplary embodiments of an electrical connection member of a multi-functional input button.

FIG. 14 illustrates exemplary embodiments of an electrical connection member of a multi-functional input button.

The transmitters of the first to third multi-functional input buttons may be interconnected by a first electrical connection member, and the receivers of the first, fourth, and fifth multi-functional input buttons may be interconnected by a second electrical connection member.

The connection member of a first exemplary embodiment may include a first conductor contacting or joining the electrode unit and moving together with the electrode unit while a multi-functional input button is moving from a first height to a second height by pressure applied to the multi-functional input button; a second conductor provided in a non-moving part of the multi-functional input button so as to receive an electrical signal from the first conductor; and a base PCB connected to the second conductor of an adjacent multi-functional input button.

The base PCB may transmit/receive driver signals or scan signals from a control unit to/from transmitters or receivers of a plurality of multi-functional input buttons.

The first conductor and the second conductor may move while maintaining contact and connection therebetween in a mutual sliding manner.

The first conductor and the second conductor may be kept contacting each other when no pressure is applied to the multi-functional input button or pressure equal to or lower than a predetermined threshold level is applied to the multi-functional input button, and the first conductor and the second conductor may be kept contacting each other and short-circuited from each other when pressure equal to or higher than the predetermined threshold level is applied to the multi-functional input button.

The first conductor and the second conductor may be arranged in a non-contact manner (1450). The first conductor and the second conductor may be formed into a conductive plate shape having a predetermined area, and contact each other with predetermine spacing therebetween.

The predetermined spacing may be filled with a non-conductor 1443 having dielectricity such as air, plastic, silicon, glass, ceramic and the like.

In this case, the electrical signal may be transmitted in the form of a radio signal having a frequency.

Thus, an abrasion of the conductors caused by friction between the first conductor and the second conductor, or signal noise may be reduced, and friction which may interfere with pressure being applied to the multi-functional input button may be minimized, and manufacturing processes may be simplified.

At least either the first electrical connection member or second electrical connection member may be printed together with the electrode unit on a flexible film as a conductor, or may be an electrical connection member provided to the elastic unit contacting or joining the electrode unit.

Figure 15:
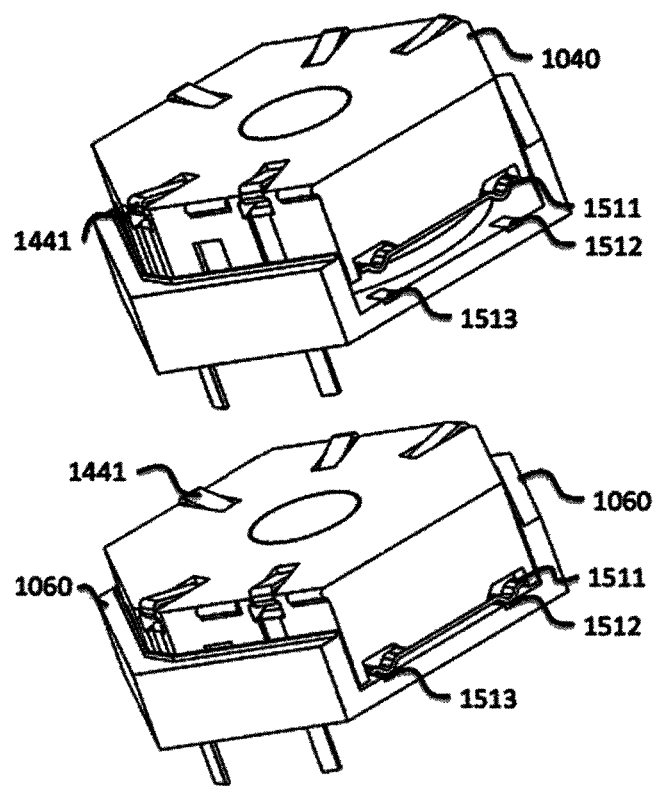
FIG. 15 illustrates an exemplary embodiment of a switch of a multi-functional input button for inputting characters.

FIG. 15 illustrates an exemplary embodiment of a switch of a multi-functional input button for inputting characters.

When the multi-functional input button moves from a first location to a second location by pressure applied thereto, switches 1511, 1512 and 1513 may operate so as to generate an electrical signal indicating an input of a predetermined character.

When the switches 1512 and 1523 provided on the base PCB or a separate membrane are connected by the terminal 1511 provided on a moving unit of the multi-functional input button, an electrical signal indicating an input of a predetermined character may be generated and transmitted to the control unit.

The switches may generate electrical signals by sensing a separate press switch, an amount of change in magnetism or electrical field, light intensity, sound, and the like.

Figure 16:
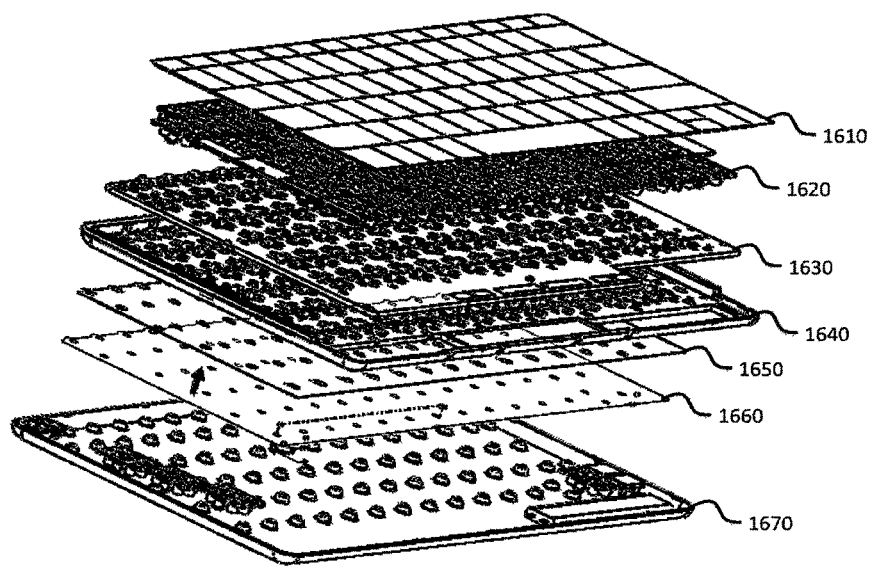
FIG. 16 illustrates an exemplary embodiment of a human interface device having a multi-functional input button.

FIG. 16 illustrates an exemplary embodiment of a human interface device having a multi-functional input button.

Figure 17:
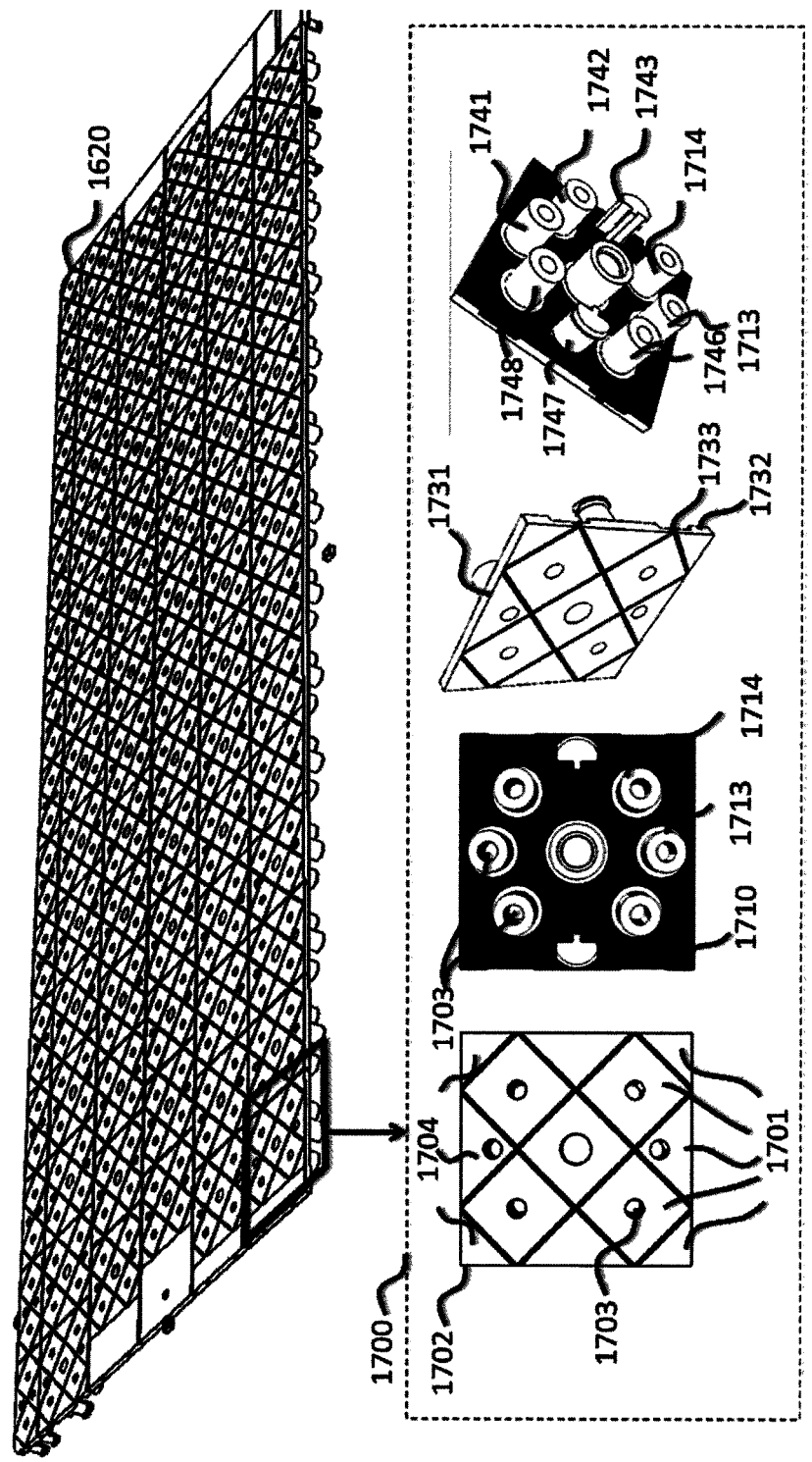
FIG. 17 illustrates an exemplary embodiment of an electrode key cap.

FIG. 17 illustrates an exemplary embodiment of an electrode key cap.

A plurality of electrode key caps 1700 may be disposed on a common plane so as to form an electrode key cap layer 1620.

For example, one electrode key cap may receive one character input and sense a predetermined amount of changes in a touch location according to a mode.

The electrode key cap layer may receive a plurality of character inputs, and sense an amount of changes in a touch location in proportion to the number of electrode key caps.

The multi-functional human interface device may include: a control unit; the cover unit 1010 on which user's finger touch is performed; the electrode key cap 1700 including first conductors 1741, 1742, 1713, 1714, 1746 and 1748 and electrode units 1020 and 1701; and a second conductor.

The second conductor may be provided in a first circuit layer 1630.

A user's finger touch on the cover unit tightly contacting a top of the electrode key cap may give an influence to an electrical field between the transmitter and receiver in the electrode, causing changes in capacity.

The first conductor may be plural in number, and provided respectively in the transmitter and receiver of the electrode unit.

When a driver signal is applied on a predetermined period through the first conductor connected to the transmitter, capacity may be generated between the transmitter and the receiver, and the generated capacity may be transmitted by the receiver through the first conductor connected to the receiver and through the second conductor electrically connected to the first conductor, and the control unit may sense changes in the transmitted capacity.

The electrode unit may be electrically connected to the second conductor through the first conductor, and the electrode unit may be disposed on a first surface 1702 of the electrode key cap, and the first conductor may be formed into a predetermined area on a column formed perpendicularly to the first surface.

The column formed perpendicularly to the first surface may be at least two in number, and the first conductor may be formed respectively on the at least two columns.

The electrode units 1020 and 1701 may include a transmitter and a receiver, and the first conductor formed respectively on the at least two columns may be electrically connected to the respective transmitter and receiver.

The first conductor may be formed to encircle the surface of the column.

The column may be formed into a tubular shape having a hole 1703 penetrating through the column, and the hole 1703 may penetrate through the first surface 1702 such that the electrode unit and the first conductor may be electrically connected through an inner wall of the hole 1703.

The electrode unit may have a plurality of pattern blocks 1701 having a specific shape on the first surface, and at least a part of the pattern blocks 1701 may be electrically interconnected through a second surface 1731 of the electrode key cap.

The plurality of pattern blocks 1704 electrically connected through the second surface may be electrically connected to the second conductor through the first conductor 1713 formed on one of the columns.

For example, the three top triangular pattern blocks on the first surface 1702 may be electrically connected by the conductor provided on the side surface 1731 adjacent to the three top triangular pattern blocks.

The three bottom triangular pattern blocks, in the same manner, may be electrically connected by the conductor provided on the side surface adjacent to the three bottom triangular pattern blocks.

In this case, the three top or bottom triangular pattern blocks may be electrically connected to one column provided at rear surfaces of the pattern blocks through a hole formed in the column.

Furthermore, triangular and diamond-shaped pattern blocks formed horizontally in an intermediate part may be electrically connected at the first surface, and electrically connected to one column provided at rear surfaces of the pattern blocks and the first conductor through a hole formed in the column in the same manner, and the column used herein may be located at a center of the rear surfaces and may also be used for the purpose of transferring pressure to the elastic unit.

In this case, the top, bottom, and the intermediate pattern blocks may transmit transmitter signals having different signal periods.

Furthermore, the two upper diamond-shaped pattern blocks disposed horizontally and the two lower diamond-shaped pattern blocks disposed horizontally may be electrically isolated on the first surface, and respectively electrically connected to the first conductor through holes formed in the respective columns provided at rear surfaces of the pattern blocks.

The first conductor may be provided respectively to the plurality of columns at a rear surface of the electrode key cap.

The plurality of pattern blocks electrically connected through the second surface may be transmitters having the same signal period.

The electrode unit may have at least three pattern blocks 1704 having a specific shape on the first surface, and the three pattern blocks may be respectively electrically connected to the second conductor through the first conductor formed on one of columns.

At least two pattern blocks among the plurality of pattern blocks may have a first signal period, and at least one pattern block among the plurality of pattern blocks may have a second signal period.

The at least three pattern blocks may be receivers.

The multi-functional human interface device may further include the elastic body 1050, and the column may transfer, to the elastic unit, pressure applied from a user to the cover unit, and enable the cover unit and the electrode key cap to move from a first location to a second location, and receive the pressure from the elastic unit when the pressure from the user is cancelled so as to enable the cover unit and the electrode key cap to move from the second location to the first location.

The electrode unit and the first conductor may be formed by plating, with a conductive material, an insulator structure including at least one flat plate, and at least two columns connected perpendicularly to the flat plate and having holes penetrating through the flat plate and the columns.

The electrode unit may have a plurality of pattern blocks having a specific shape on the first surface, and a plurality of columns formed on a third surface 1710 disposed on at the rear of the first surface.

The first conductors may be formed on the plurality of columns, and the first conductors formed on the plurality of columns may be electrically short-circuited by the third surface.

The electrode unit may have a plurality of pattern blocks having a specific shape on the first surface, and the plurality of pattern blocks may be electrically connected to the fourth surface 1732 disposed at one side of the first surface, but electrically short-circuited from each other by an electrical short-circuit 1733 formed on the fourth surface 1732.

The pattern blocks may not be limited to those illustrated in the drawings, and may include various patterns such as a rectangular pattern and a comb teeth pattern.

The multi-functional human interface device may include a plurality of electrode key caps, and the first conductors provided to the plurality of electrode key caps may transmit electrical signals to the plurality of second conductors, and the plurality of second conductors may form one first circuit layer 1630.

The multi-functional human interface device may further include a light source beneath the electrode key cap, and the column may have a tubular shape having a hole penetrating the column, and the cover unit may be made of a conductive plate material for diffusing light and receive light from the light source through the hole so as to emit the light.

The hole may be necessarily used so as to electrically connect the electrode unit and the first conductor of the electrode key cap in a plating manner.

However, the plating may make the electrode key cap opaque, and thus it may be difficult to provide a keyboard with a function of emitting light to allow for ease of work in a dark place.

The light may be transmitted through the hole, and thus the hole may be used as an electrical connection path and a light path.

The cover unit may have a user contact surface printed or carved with a character for guiding text input, or a film perforated with the shape of the character may be attached to the cover unit.

The first conductor and the second conductor may respective predetermined areas facing each other in a non-contact manner, and an electrical signal of a high frequency may be transmitted through the predetermined area in a non-contact manner.

For example, if the column has a cylindrical shape, the surface of the column facing the first conductor and the second conductor in a non-contact manner may have a band shape with a predetermined width, and if the column is a square column, the surface may have a square band shape with a predetermined width. Alternatively, only a part of the column may be provided with the first conductor so as to form a facing surface having a desired shape and area.

FIG. 18 to FIG. 22 illustrate an exemplary embodiment of electrode patterns of a plurality of multi-functional input buttons.

The multi-functional human interface device may be used in a variety of electronic devices such as an input device for a desk top, an input device for a table PC, an input device for a notebook, an input device for controlling a home theater, an input device for controlling multimedia of an automatic driving vehicle, and an input device for virtual reality or augmented reality.

The electronic device having the multi-functional human interface device may include first to fifth multi-functional input buttons.

The first to fifth multi-functional input buttons may respectively receive different character inputs, and receive touch inputs for controlling one piece of pointer location information from a user.

The first to fifth multi-functional input buttons may be provided on an X-axis or Y-axis without being aligned in a line.

For example, the first to third multi-functional input buttons may be aligned in a line in an X-axis direction, and the fourth and fifth multi-function input buttons may be disposed above and below the X-axis.

Furthermore, the fourth multi-functional input button 1240 may not be aligned with the first multi-functional input button with respect to a Y-axis, but may be 25 percent spaced apart leftward.

The fifth multi-functional input button 1250 may not be aligned with the first multi-functional input button with respect to a Y-axis, but may be 50 percent spaced apart rightward.

The transmitters having the same driver signal may be aligned in a line and the receivers having the same scan signal period may be aligned in a line, among the plurality of transmitters and the plurality of receivers, so as to enable the first to fifth multi-functional input buttons to control one piece of pointer location information.

Since the first to fifth multi-functional input buttons are not aligned in a line with respect to an X-axis or Y-axis, the multi-functional input buttons may have two to four receivers or transmitter parallel to an X-axis or Y-axis such that the receivers or transmitters can be aligned even though the multi-functional input buttons are not aligned in a line with respect to an X-axis or Y-axis.

Each of the multi-functional input buttons may include electrode units 1020*a*, 1020*b*, 1020*c*, 1020*d*, 1020*e*, 1020*f*, 1020*g*, 1020*h*, 1020*i*, 1020*j*, 1020*k* and 1020*l* formed of transmitter units T1, T2, T3 and T4 and receiver units R1, R2, R3 and R4.

The transmitter units of the electrode units may be arranged in parallel to an X-axis, and the receiver units of the electrode units may be arranged in parallel to a Y-axis (1020*a*, 1020*c*, 1020*e*, 1020*g*, 1020*i*, and 1020*k*).

In the exemplary embodiments to be described hereinafter, the electrode unit will be described as having transmitters parallel to an X-axis and receivers parallel to a Y-axis, but the configuration in which the transmitters and receivers are switched with each other may also be possible, that is, the receivers may be arranged in parallel to an X-axis and the transmitters may be arranged in parallel to a Y-axis.

The electrode units may have transmitters parallel to a Y-axis and receivers transmitters parallel to an X-axis (1020*b*, 1020*d*, 1020*f*, 1020*h*, 1020*j*, and 1020*l*).

Figure 18:
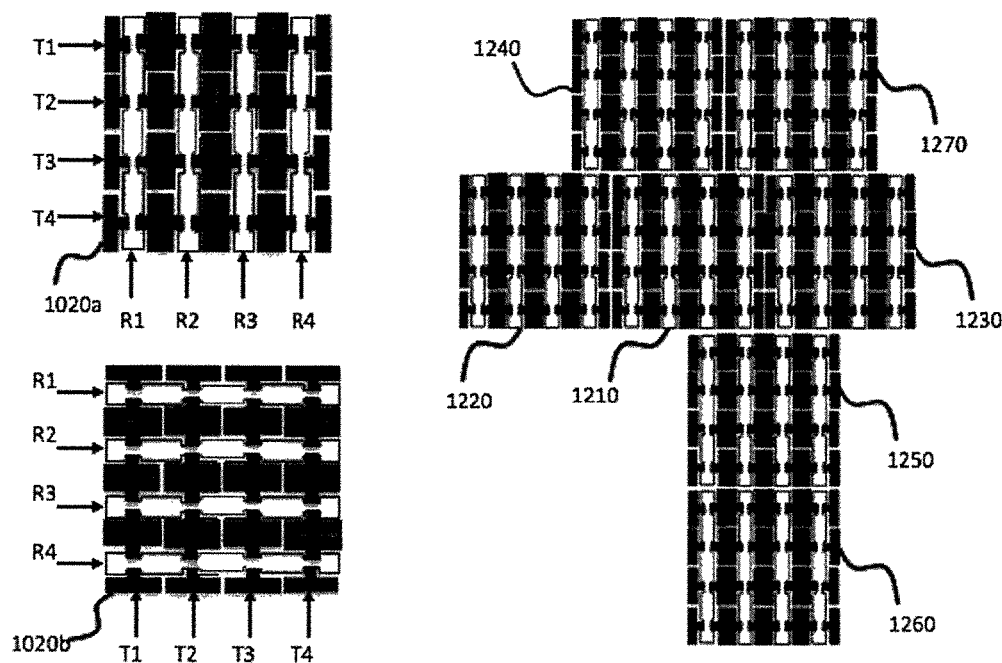
FIG. 18 to FIG. 22 illustrate an exemplary embodiment of electrode patterns of a plurality of multi-functional input buttons.

FIG. 18 illustrates an exemplary embodiment of electrode patterns of a plurality of multi-functional input buttons, in which the electrode unit may include four transmitters and four receivers.

Although, in the exemplary embodiments to be described hereinafter, the electrode unit will be described as having four transmitters parallel to an X-axis and four receivers 1020*a* parallel to a Y-axis, the configuration in which four receivers are arranged in parallel to an X-axis and four transmitters 1020*b* are arranged in parallel to a Y-axis may also be possible.

The transmitter unit may have first to fourth transmitters having at least two driver signal periods, and the receiver unit may have first to fourth receivers R1, R2, R3, and R4 having at least two scan signal periods different from each other.

The first receiver of the fourth multi-functional input button 1240 may have a scan signal period same as that of the fourth receiver of the second multi-functional input button 1220.

The second receiver of the fourth multi-functional input button 1240 may have a scan signal period same as that of the first receiver of the first multi-functional input button 1210.

The third receiver of the fourth multi-functional input button 1240 may have a scan signal period same as that of the second receiver of the first multi-functional input button 1210.

The fourth receiver of the fourth multi-functional input button 1240 may have a scan signal period same as those of the third receiver of the first multi-functional input button 1210 and the first receiver of the fifth multi-functional input button 1250.

The electronic device having the multi-functional human interface device may have the sixth multi-functional input button 1260, and the sixth multi-functional input button 1260 may be aligned adjacent to the fifth multi-functional input button 1250 on a Y-axis, and the first to fourth receivers of the sixth multi-functional input button 1260 may have a scan signal period same as those of the first to fourth receivers of the fifth multi-functional input button 1250.

On the contrary, the fifth multi-functional input button 1250 and the sixth multi-functional input button 1260 may have driver signal periods different from each other.

The electronic device having the multi-functional human interface device may have a seventh multi-functional input button 1270.

The first receiver of the seventh multi-functional input button 1270 may have a scan signal period same as those of the fourth receiver of the first multi-functional input button 1210 and the second receiver of the fifth multi-functional input button 1250.

The second receiver of the seventh multi-functional input button 1270 may have a scan signal period same as those of the first receiver of the third multi-functional input button 1230 and the third receiver of the fifth multi-functional input button 1250.

The first transmitters of the first to third multi-functional input buttons may have a first driver period, and the second transmitters of the first to third multi-functional input buttons may have a second driver period.

The first transmitters of the fourth and seventh multi-functional input buttons may have a third driver period, and the second transmitters of the fourth and seventh multi-functional input buttons may have a fourth driver period.

The first transmitter of the fifth multi-functional input button may have a fifth driver period, and the second transmitter of the fifth multi-functional input button may have a six driver period.

The first transmitter of the sixth multi-functional input button may have a seventh driver period, and the second transmitter of the sixth multi-functional input button may have an eighth driver period.

At least two of the first to fifth multi-functional input buttons may respectively have the first and second receivers having the same scan signal period, and the third and fourth receivers having the same scan signal period.

At least two of the first to fifth multi-functional input buttons may respectively have the second and third receivers having the same scan signal period, and the first and fourth receivers having scan signal periods different from each other.

For example, the first multi-functional input button may have the first and second receivers having a first scan signal period, and the third and fourth receivers having a second scan signal period.

The third multi-functional input button may have the first and second receivers having a third scan signal period, and the third and fourth receivers having a fourth scan signal period.

The fourth multi-functional input button may have the first receiver having a fifth scan signal period, and the second and third receivers having the first scan signal period, and the fourth receiver having the second scan signal period.

The seventh multi-functional input button may have the first receiver having the second scan signal period, and the second and third receivers having the third scan signal period, and the fourth receiver having the fourth scan signal period.

Figure 19:
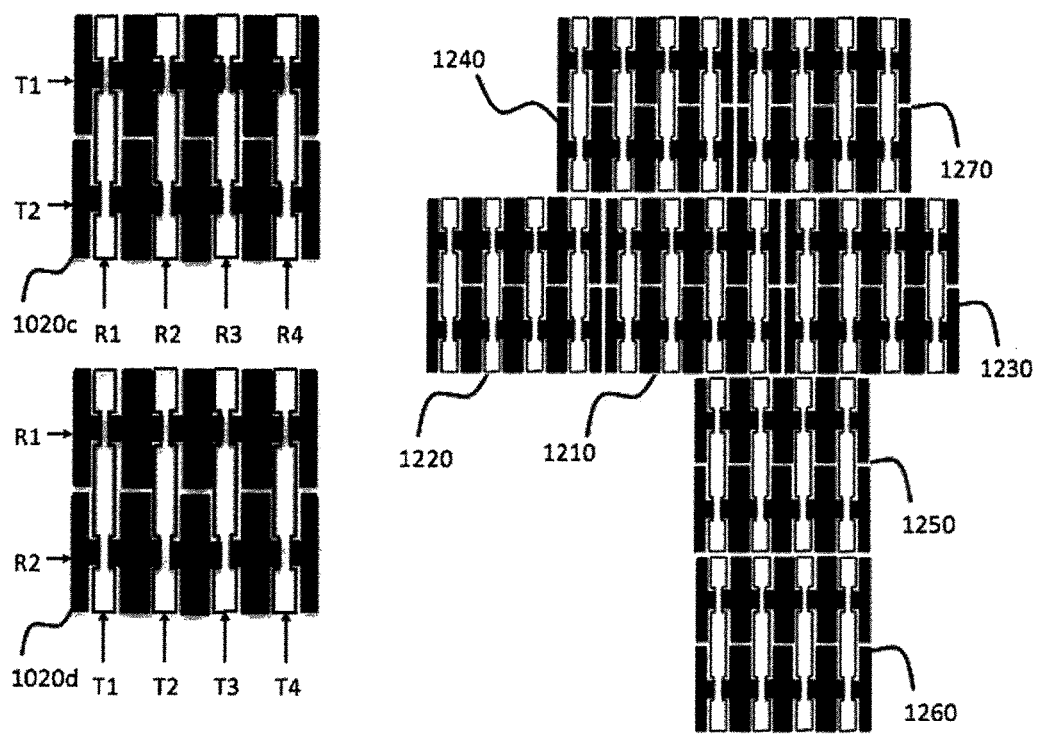
Figure 20:
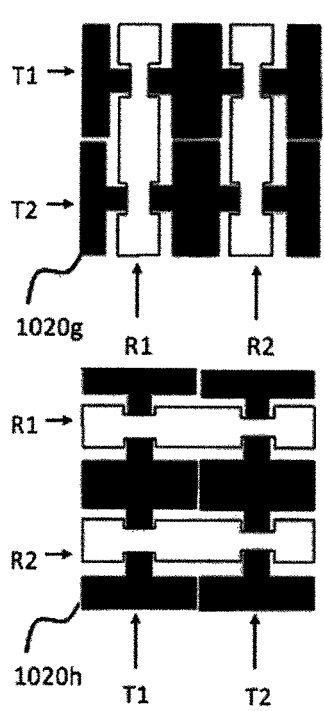
Figure 20:
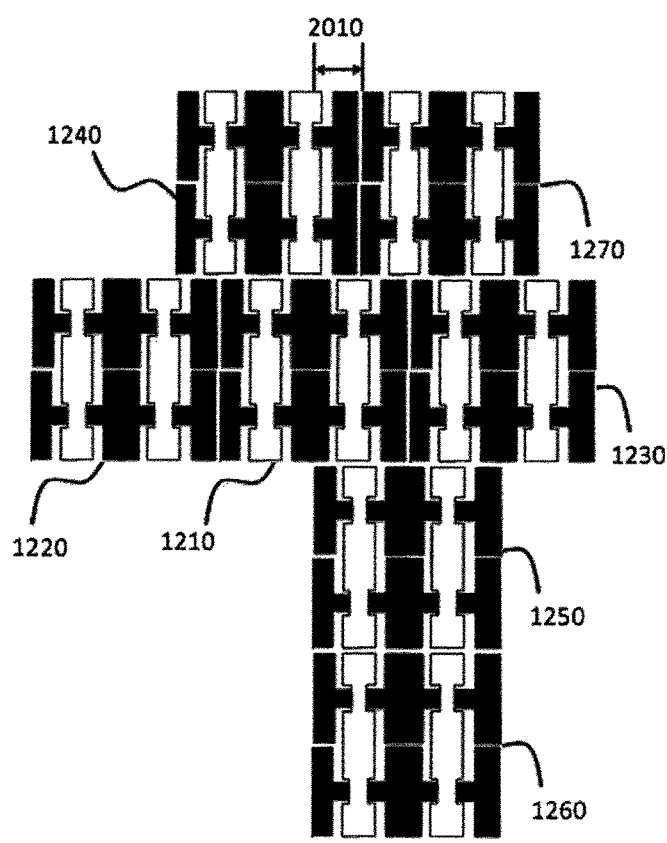
Figure 21:
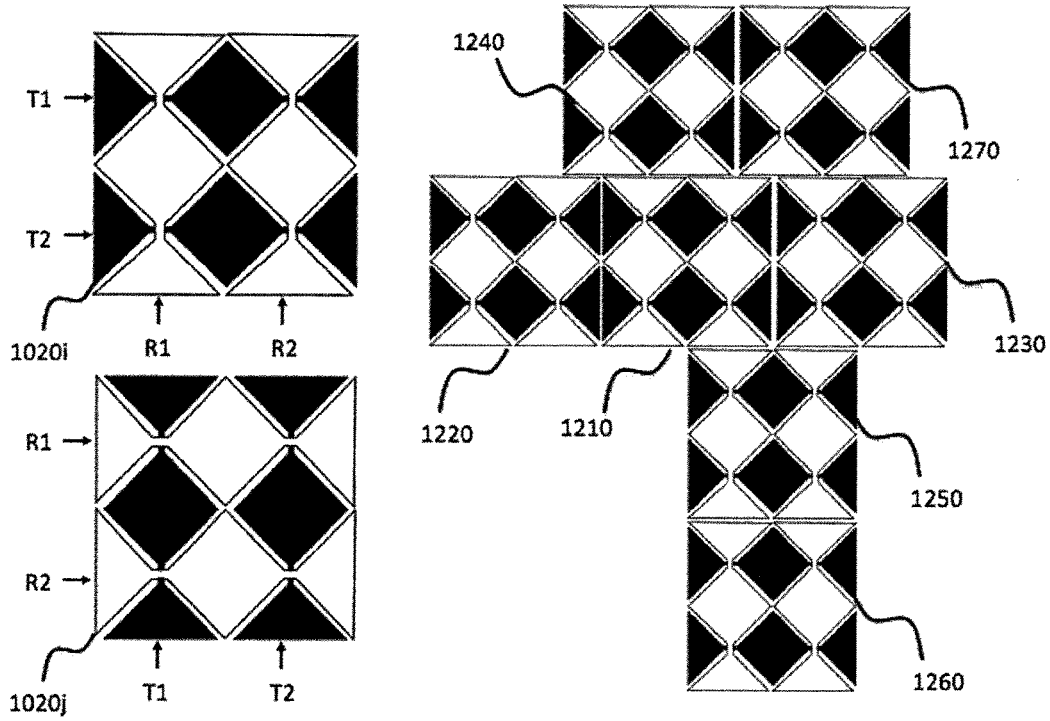
Figure 22:
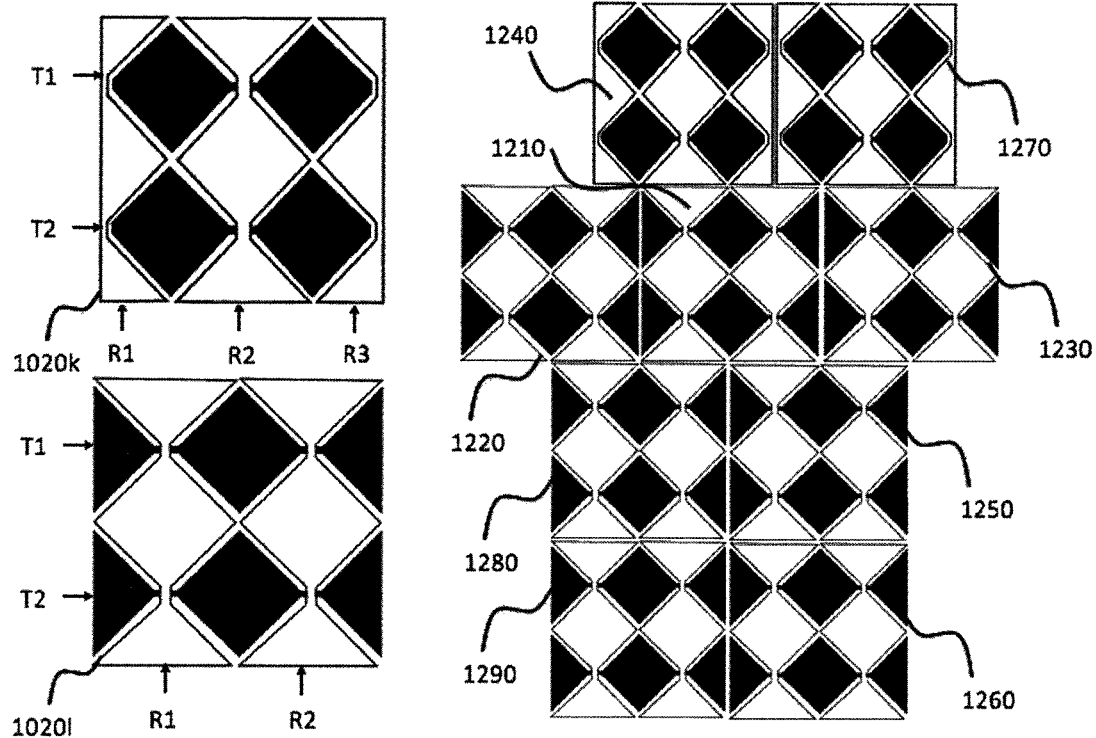

FIG. 19 illustrates an exemplary embodiment of electrode patterns of a plurality of multi-functional input buttons, in which the electrode unit may include two transmitters parallel to an X-axis and four receivers 1020c parallel to a Y-axis.

Although, in the exemplary embodiments to be described hereinafter, the electrode unit will be described as having two transmitters parallel to an X-axis and four receivers 1020c parallel to a Y-axis, the configuration in which two receivers are arranged in parallel to an X-axis and four transmitters 1020d are arranged in parallel to a Y-axis may also be possible.

The electronic device having the multi-functional human interface device may include first to fifth multi-functional input buttons, and each of the multi-functional input buttons may have an electrode unit formed of a transmitter unit and a receiver unit.

The transmitter unit may have first and second transmitters having driver signal periods different from each other, and the receiver unit may have first and second receivers having scan signal periods different from each other.

The second receiver of the first multi-functional input button may have a scan signal period same as that of the first receiver of the fifth multi-functional input button, and the first receiver of the third multi-functional input button may have a scan signal period same as that of the second receiver of the fifth multi-functional input button.

The first transmitters of the first to third multi-functional input buttons may have a first driver signal period, the second transmitters of the first to third multi-functional input buttons may have a second driver signal period, the first transmitter of the fourth multi-functional input button may have a third driver signal period, the second transmitter of the fourth multi-functional input button may have a fourth driver signal period, the first transmitter of the fifth multi-functional input button may have a fifth driver signal period, and the second transmitter of the fifth multi-functional input button may have a sixth driver signal period.

The central points of the first to third multi-functional input buttons may be disposed on a virtual X-axis, the first and second transmitters of the first to fifth multi-functional input buttons may be substantially parallel to the virtual X-axis, and the first receiver and the second receiver of the first to fifth multi-functional input buttons may be substantially perpendicular to the virtual X-axis.

The second receiver of the first multi-functional input button, the first receiver of the fifth multi-functional input button, and the second receiver of the fourth multi-functional input button may have the same scan signal period.

Alternatively, the second receiver of the first multi-functional input button, the first receiver of the fifth multi-functional input button, and the first receiver of the seventh multi-functional input button may have the same scan signal period.

The second receiver of the first multi-functional input button and the first receiver of the fifth multi-functional input button may be aligned in a line perpendicular to the X-axis, and the second receiver of the fourth multi-functional input button and the first receiver of the seventh multi-functional input button may be spaced apart from each other by a first distance 2010.

This may be required for simplifying patterns so as to reduce manufacturing cost of multi-functional input buttons. In this case, a software correction in a user touch input may be required.

The first and fourth multi-functional input buttons may have a control unit for correcting coordinates of a user touch input in an X-axis direction in correspondence to the first distance when user touch is continuously input perpendicularly to the X-axis from the first multi-functional input button to the fourth multi-functional input button.

The first to fifth multi-functional input buttons may include a control unit for sensing user touch continuously input from a region including surfaces of the first to fifth multi-functional input buttons, and continuously controlling one pointer location.

The first to fifth multi-functional input buttons may include respectively a control unit for sensing a user pressure signal and generating first to fifth character input signals.

That is, the plurality of multi-functional input buttons may generate respective characters corresponding to the respective keys of a keyboard, and simultaneously generate pointer location information such as one mouse pointer by a continuous user touch input generated across buttons in a touch surface region of the adjacent plurality of multi-functional input buttons, and control the movement of the pointer location.

When a plurality of touches are simultaneously performed in the touch surface region of the adjacent plurality of multi-functional input buttons, a multi-touch function such as zoom in, zoom out, scrolling, and screen switching may be performed.

As for the electrode unit 1020h in which the receivers are parallel to an X-axis and the transmitters are parallel to a Y-axis, an electronic device having the multi-functional human interface device may include first to fifth multi-functional input buttons, and the respective multi-functional input buttons may include an electrode unit including a transmitter unit and a receiver unit, and the transmitter unit may include first and second transmitters having driver signal periods different from each other, and the receiver unit may include first and second receivers having scan signal periods different from each other.

The second transmitter of the first multi-functional input button may have a driver signal period same as that of the first transmitter of the fifth multi-functional input button, and the first transmitter of the third multi-functional input button may have a driver signal period same as that of the second transmitter of the fifth multi-functional input button.

The first receivers of the first to third multi-functional input buttons may have a first scan signal period, the second receivers of the first to third multi-functional input buttons may have a second scan signal period, the first receiver of the fourth multi-functional input button may have a third scan signal period, the second receiver of the fourth multi-functional input button may have a fourth scan signal period, the first receiver of the fifth multi-functional input button may have a fifth scan signal period, and the second receiver of the fifth multi-functional input button may have a sixth scan signal period.

The central point of the first to third multi-functional input buttons may be disposed on a virtual X-axis, the first and second receivers of the first to fifth multi-functional input buttons may be substantially parallel to the virtual X-axis, and the first and second transmitters of the first to fifth multi-functional input buttons may be substantially perpendicular to the virtual X-axis.

The second transmitter of the first multi-functional input button and the first transmitter of the fifth multi-functional input button may be aligned in a line perpendicular to the X-axis, and may be interposed between the second transmitter of the fourth multi-functional input button and the first transmitter of the seventh multi-functional input button.

Figure 23:
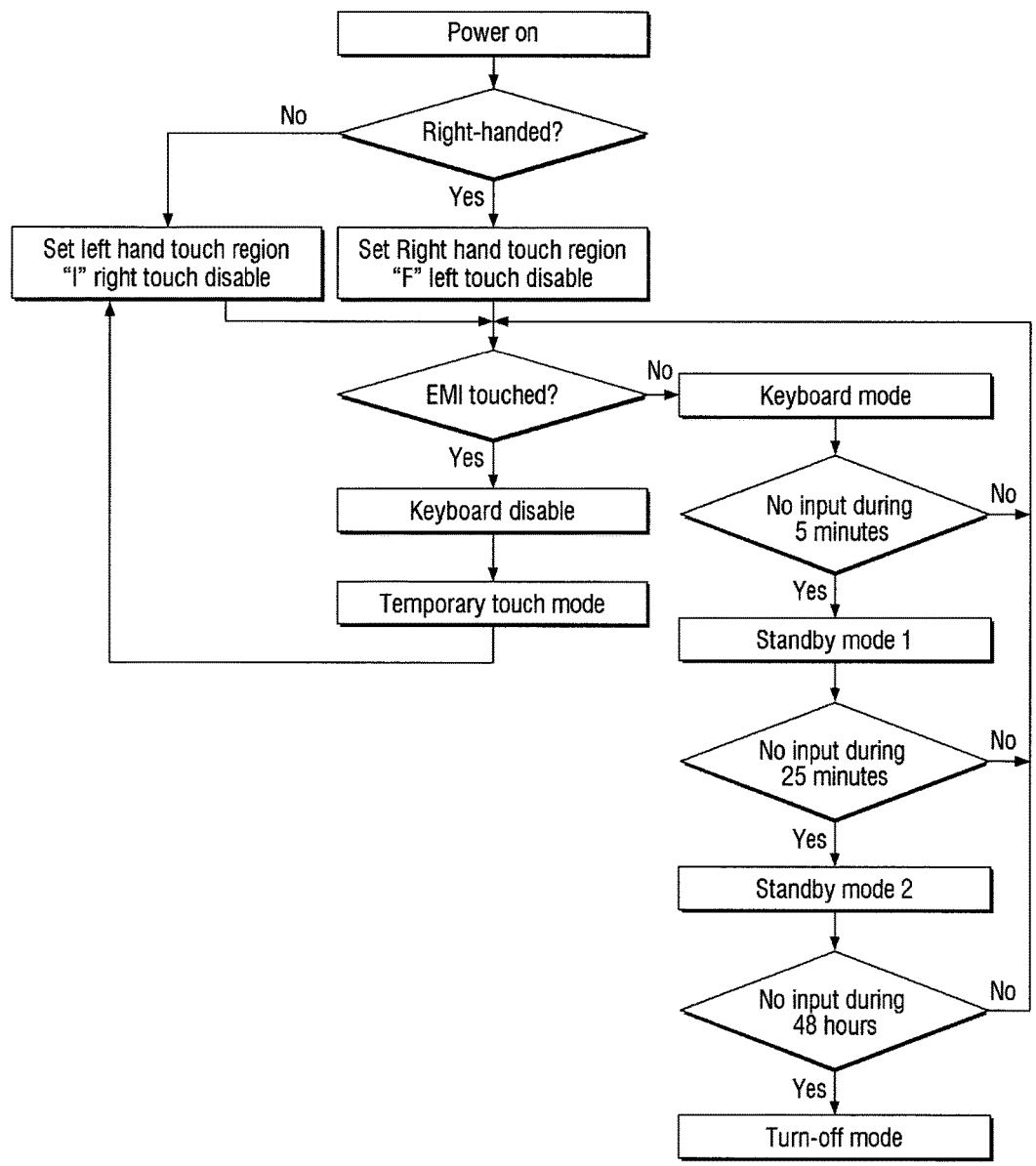
FIG. 23 is a flowchart illustrating a method for switching between a text input mode and a pointer location information input mode.

FIG. 23 is a flowchart illustrating a method for switching between a text input mode and a pointer location information input mode.

The electronic device having a multi-functional human interface device may have a right-handed mode and a left-handed mode.

The right-handed mode may set a touch region such that a user touch can be easily input to the touch region from a right hand of a user.

The left-handed mode may set a touch region such that a user touch can be easily input to the touch region from a left hand of a user.

The right-handed mode and the left-handed mode may be set on the electronic device having a multi-functional human interface device by a separate switch, at least two simultaneous text inputs, a predetermined touch pattern, a combination of a text input and a touch input, an input through a mode switching unit, and the like.

The electronic device having a multi-functional human interface device may include a first pointer execution instruction button and a second pointer execution instruction button operating by pressure applied from a user, and the first pointer execution instruction button and the second pointer execution instruction button may further include a sensor for sensing a user touch input, and the electronic device having a multi-functional human interface device may be switched to a temporary touch mode when a touch input is received to the first pointer execution instruction button and the second pointer execution instruction button.

The temporary touch mode may be cancelled and switched to a text input mode when the user touch is cancelled from the first pointer execution instruction button or the second pointer execution instruction button.

The first pointer execution instruction button may be disposed at a left side of the second pointer execution instruction button and adjacent to a left thumb of the user, and the second pointer execution instruction button may be disposed adjacent to a right thumb of the user.

When the electronic device having a multi-function human interface device is switched to the temporary touch mode through the touch sensor provided in the first pointer execution instruction button, the electronic device having a multi-functional human interface device may be switched to the right-handed mode.

The right-handed mode may set a right hand touch region 108b for receiving pointer location information such that a touch input by a right hand can be easily performed.

The right hand touch region 108b may be set to cover an area excluding a region on which a user's left hand finger is put to input text.

For example, a general keyboard-type multi-functional human interface may have layouts in which a left side from a Y-axis including character F key is set as an inactive touch region and a right side from a Y-axis including character G key is set as an active touch region.

When the electronic device having a multi-function human interface device is switched to the temporary touch mode through the touch sensor provided in the second pointer execution instruction button, the electronic device having a multi-functional human interface device may be switched to the left-handed mode.

The left-handed mode may set a left hand touch region 108a for receiving pointer location information such that a touch input by a left hand can be easily performed.

The left hand touch region 108a may be set to cover an area excluding a region on which a user's right hand finger is put to input text.

For example, a general keyboard-type multi-functional human interface may have layouts in which a right side from a Y-axis including character J key is set as an inactive touch region and a left side from a Y-axis including character H key is set as an active touch region.

Furthermore, an external device connected to the electronic device having a multi-functional human interface device may have a preset left or right mode.

The temporary touch mode may be switched to the right hand touch mode when, in US international keyboard layouts, user touch inputs are generated simultaneously from at least two among a plurality of multi-functional input buttons for generating input signals of characters Q, W, E, and R, and the right hand touch mode is cancelled and switched to a text input mode when the at least two user touch inputs are cancelled.

The temporary touch mode may be switched to the right hand touch mode when, in US international keyboard layouts, user touch inputs are generated simultaneously from at least two among a plurality of multi-functional input buttons for generating input signals of characters Z, X, C, and V, and the right hand touch mode is cancelled and switched to a text input mode when the at least two user touch inputs are cancelled.

The temporary touch mode may be switched to the left hand touch mode when, in US international keyboard layouts, user touch inputs are generated simultaneously from at least two among a plurality of multi-functional input buttons for generating input signals of characters U, I, O, and P, and the left hand touch mode is cancelled and switched to a text input mode when the at least two user touch inputs are cancelled.

The temporary touch mode may be switched to the left hand touch mode when, in US international keyboard layouts, user touch inputs are generated simultaneously from at least two among a plurality of multi-functional input buttons for generating input signals of characters M, <, >, and ?, and the left hand touch mode is cancelled and switched to a text input mode when the at least two user touch inputs are cancelled.

The multi-functional input buttons in which at least two touch inputs may occur simultaneously, may function as a first pointer execution instruction input or a second pointer execution instruction input of the pointer being controlled during execution of the temporary touch mode, when a pressure signal is further received during maintenance of the touch inputs.

The text input mode may be inactivated when the temporary touch mode is activated.

When the text input mode is inactivated, an exception may be made in which at least one text input is allowed.

Figure 24:
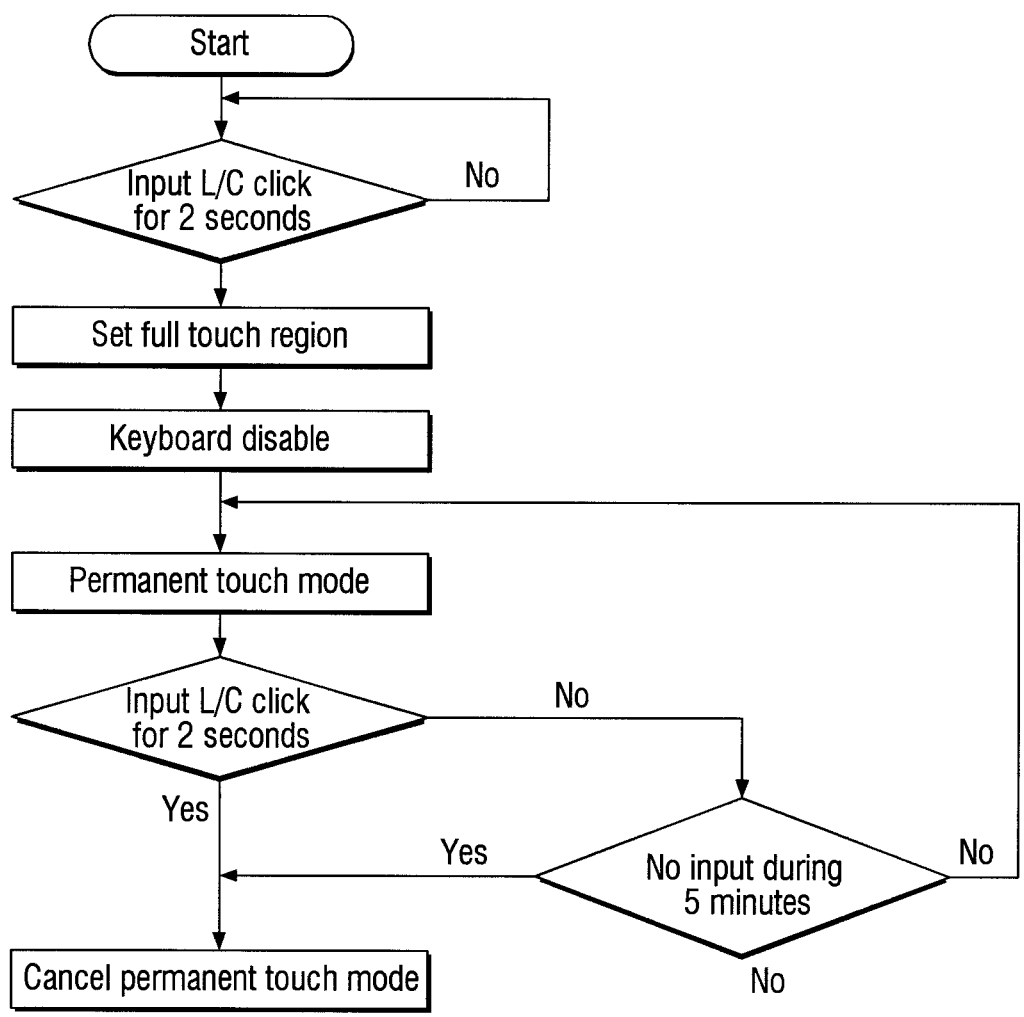
FIG. 24 is a flowchart illustrating a method for switching to a permanent touch mode.

FIG. 24 is a flowchart illustrating a method for switching to a permanent touch mode.

When the first pointer execution instruction button and the second pointer execution instruction button are pressed simultaneously for a preset time, the electronic device having a multi-functional human interface device may be set to a permanent touch mode.

The electronic device having a multi-functional human interface device may be set to a permanent touch mode by a separate switch, at least two simultaneous text inputs, a predetermined touch pattern, a combination of a text input and a touch input, an operation of a mode switching unit, and the like.

The permanent touch mode may receive a pointer location information input from a user without the need to maintain a separate user input for the pointer location information input.

For example, in the temporary touch mode, the electronic device having a multi-functional human interface device may be basically set to a text input mode, and switched to the temporary touch mode during maintenance of a separate user input, and the temporary touch mode may be cancelled and switched to the text input mode when the separate user input is cancelled.

In the permanent touch mode, the electronic device having a multi-functional human interface device may be basically set to the permanent touch mode, and the text input mode may be in activated.

The permanent touch mode may be cancelled under a preset condition.

For example, the permanent touch mode may be cancelled when there is no user input for a preset time in the set permanent touch mode.

The permanent touch mode may be cancelled when a predefined touch pattern, a predetermined button, a text input button in which the exception of inactivation is made, repeated text, and a plurality of pieces of text are simultaneously input in the set permanent touch mode.

The permanent touch mode may include at least a part of a touch region in the right hand touch mode and at least a part of a touch region in the left hand touch mode, and may have a region wider than the touch region in the right hand touch mode and the touch region in the left hand touch mode.

Preferably, the region of the permanent touch mode may be the sum of the touch region in the right hand touch mode and the touch region in the left hand touch mode.

FIG. 1 to FIG. 24 illustrate an exemplary embodiment of a text input device integrated with a pointing device as the electronic device having a multi-functional human interface device, and the types of the text input device and the pointing location information input device and techniques used herein may be changed or replaced by a person skilled in the art without departing from basic purposes.

What is claimed is:

1. An electronic device having a multi-functional human interface, comprising:
   first to fifth multi-functional input buttons,
   wherein each of the multi-functional input buttons includes an electrode unit including a transmitter unit and a receiver unit,
   the transmitter unit has first and second transmitters having driver signal periods different from each other, and the receiver unit has first to fourth receivers having at least two scan signal periods different from each other,
   the first receiver of the fourth multi-functional input button has a scan signal period same as a scan signal period of the fourth receiver of the second multi-functional input button,
   the second receiver of the fourth multi-functional input button has a scan signal period same as a scan signal period of the first receiver of the first multi-functional input button, the third receiver of the fourth multi-functional input button has a scan signal period same as a scan signal period of the second receiver of the first multi-functional input button, and
   the fourth receiver of the fourth multi-functional input button has a scan signal period same as scan signal periods of the third receiver of the first multi-functional input button and the first receiver of the fifth multi-functional input button,
   a seventh multi-functional input button,
   wherein a first receiver of the seventh multi-functional input button has a scan signal period same as scan signal periods of the fourth receiver of the first multi-functional input button and the second receiver of the fifth multi-functional input button, and a second receiver of the seventh multi-functional input button has a scan signal period same as scan signal periods of the first receiver of the third multi-functional input button and the third receiver of the fifth multi-functional input button,
   wherein each of at least two multi-functional input buttons amonq the first to fifth multi-functional input buttons has the first and second receivers having a same scan signal period, and the third and fourth receivers having a same scan signal period, and
   each of at least two multi-functional input buttons among the first to fifth multi-functional input buttons has the second and third receivers having a same scan signal period, and the first and fourth receivers having scan signal periods different from each other.

2. The electronic device having a multi-functional human interface of claim 1, comprising a sixth multi-functional input button,
   wherein first to fourth receivers of the sixth multi-functional input button have scan signal periods respectively same as scan signal periods of the first to fourth receivers of the fifth multi-functional input button.

3. The electronic device having a multi-functional human interface of claim 1, wherein the first transmitters of the first to third multi-functional input buttons have a first driver period, and
   the second transmitters of the first to third multi-functional input buttons have a second driver period.

4. The electronic device having a multi-functional human interface of claim 1, wherein the first transmitters of the fourth multi-functional input button and the seventh multi-functional input button have a third driver period, and the second transmitters of the fourth multi-functional input button and the seventh multi-functional input button have a fourth driver period.

5. The electronic device having a multi-functional human interface of claim 1, wherein the first transmitter of the fifth multi-functional input button has a fifth driver period, and
the second transmitter of the fifth multi-functional input button has a sixth driver period.

6. The electronic device having a multi-functional human interface of claim 2, wherein the first transmitter of the sixth multi-functional input button has a seventh driver period, and the second transmitter of the sixth multi-functional input button has an eighth driver period.

7. An electronic device having a multi-functional human interface, comprising:
first to fifth multi-functional input buttons,
wherein each of the multi-functional input buttons includes an electrode unit including a transmitter unit and a receiver unit,
the transmitter unit has first and second transmitters having driver signal periods different from each other, and the receiver unit has first and second receivers having scan signal periods different from each other,
the second receiver of the first multi-functional input button has a scan signal period same as a scan signal period of the first receiver of the fifth multi-functional input button, and the first receiver of the third multi-functional input button has a scan signal period same as a scan signal period of the second receiver of the fifth multi-functional input button,
wherein central points of the first to third multi-functional input buttons are disposed on a virtual X-axis, the first and second transmitters of the first to fifth multi-functional input buttons are substantially parallel to the virtual X-axis, and the first receiver and the second receiver of the first to fifth multi-functional input buttons are substantially perpendicular to the virtual X-axis,
wherein either the second receiver of the first multi-functional input button and the first receiver of the fifth multi-functional input button, or the second receiver of the fourth multi-functional input button and the first receiver of the seventh multi-functional input button has a same scan signal period, and
wherein the second receiver of the first multi-functional input button and the first receiver of the fifth multi-functional input button are aligned in a line perpendicular to the X-axis, and the second receiver of the first multi-functional input button and the first receiver of the seventh multi-functional input button are spaced apart from each other by a first distance.

8. The electronic device having a multi-functional human interface of claim 7, wherein the first transmitters of the first to third multi-functional input buttons have a first driver signal period, the second transmitters of the first to third multi-functional input buttons have a second driver signal period, the first transmitter of the fourth multi-functional input button has a third driver signal period, the second transmitter of the fourth multi-functional input button has a fourth driver signal period, the first transmitter of the fifth multi-functional input button has a fifth driver signal period, and the second transmitter of the fifth multi-functional input button has a sixth driver signal period.

9. The electronic device having a multi-functional human interface of claim 7, comprising a control unit for correcting coordinates of a user touch input in an X-axis direction in correspondence to the first distance when a user touch is continuously input perpendicularly to the X-axis from the first multi-functional input button to the fourth multi-functional input button.

10. The electronic device having a multi-functional human interface of claim 7, wherein the first to fifth multi-functional input buttons include a control unit for sensing a user touch continuously input from a region including surfaces of the first to fifth multi-functional input buttons, and continuously controlling one pointer location.

11. The electronic device having a multi-functional human interface of claim 7, wherein each of the first to fifth multi-functional input buttons includes a control unit for sensing a user pressure signal and generating respectively first to fifth character input signals.

12. An electronic device having a multi-functional human interface, comprising: first to fifth multi-functional input buttons,
wherein each of the multi-functional input buttons includes an electrode unit including a transmitter unit and a receiver unit,
the transmitter unit has first and second transmitters having driver signal periods different from each other, and the receiver unit has first and second receivers having scan signal periods different from each other,
the second transmitter of the first multi-functional input button has a drive signal period same as a drive signal period of the first transmitter of the fifth multi-functional input button, and
the first transmitter of the third multi-functional input button has a drive signal period same as a drive signal period of the second transmitter of the fifth multi-functional input button,
wherein the first receivers of the first to third multi-functional input buttons have a first scan signal period, the second receivers of the first to third multi-functional input buttons have a second scan signal period, the first receiver of the fourth multi-functional input button has a third scan signal period, the second receiver of the fourth multi-functional input button has a fourth scan signal period, the first receiver of the fifth multi-functional input button has a fifth scan signal period, and the second receiver of the fifth multi-functional input button has a sixth scan signal period, and
wherein the second transmitter of the first multi-functional input button and the first transmitter of the fifth multi-functional input button are aligned in a line perpendicular to the X-axis, and interposed between the second transmitter of the fourth multi-functional input button and the first transmitter of a seventh multi-functional input button.

13. The electronic device having a multi-functional human interface of claim 12, wherein central points of the first to third multi-functional input buttons are disposed on a virtual X-axis, the first and second receivers of the first to fifth multi-functional input buttons are substantially parallel to the virtual X-axis, and the first and second transmitters of the first to fifth multi-functional input buttons are substantially perpendicular to the virtual X-axis.

* * * * *